United States Patent
Garg et al.

(10) Patent No.: US 7,689,628 B2
(45) Date of Patent: Mar. 30, 2010

(54) MONITORING SEVERAL DISTRIBUTED RESOURCE ELEMENTS AS A RESOURCE POOL

(76) Inventors: Atul Garg, 14943 Granite Ct., Saratoga, CA (US) 95070; Joe Scarpelli, 320 Camille Ct., #C, Mountain View, CA (US) 94040; Bopana Ganapathy, 492, 80 Feet Road, RT Nagar, Bangalore (IN) 560032; Dasari Subramanyeswara Rao, 101 Samhita Residency, 4th Cross, 1st Main, Bhuvaneswari Nagar, C.V. Raman Nagar Post, Bangalore (IN) 560093; Girish Narasimha Raghavan, 2565, 9th Main, 2nd Stage, Banashankari, Bangalore (IN) 560070; Krishna Murthy Nazare, 343, 'Narayana Kruppa', 66th Cross, 5th Block, Rajajinagar, Bangalore (IN) 560010; Anil Kumar Sondekoppa Hanumappa, 1890, 20B Cross, 20th Main, Vijayanagar, Bangalore (IN) 560040

(*) Notice: Subject to any disclaimer, the term of this patent is extended or adjusted under 35 U.S.C. 154(b) by 285 days.

(21) Appl. No.: 11/160,664

(22) Filed: Jul. 5, 2005

(65) Prior Publication Data
US 2006/0265353 A1 Nov. 23, 2006

(30) Foreign Application Priority Data
May 19, 2005 (IN) .................................. 599/05

(51) Int. Cl.
*G06F 7/00* (2006.01)
(52) U.S. Cl. .................. 707/793; 709/224; 715/736
(58) Field of Classification Search .................. 707/100; 709/224, 225, 226
See application file for complete search history.

(56) References Cited

U.S. PATENT DOCUMENTS

| | | | |
|---|---|---|---|
| 6,122,664 A * | 9/2000 | Boukobza et al. ........... 709/224 |
| 6,453,346 B1 | 9/2002 | Garg et al. |
| 6,664,978 B1 * | 12/2003 | Kekic et al. ................. 715/733 |
| 6,816,898 B1 | 11/2004 | Scarpelli et al. |
| 6,856,601 B1 * | 2/2005 | Bell et al. .................... 370/252 |
| 6,963,911 B2 * | 11/2005 | Gebhardt Jr. et al. ........ 709/223 |
| 7,143,153 B1 * | 11/2006 | Black et al. ................. 709/223 |
| 2002/0198985 A1 * | 12/2002 | Fraenkel et al. ............ 709/224 |
| 2003/0126256 A1 * | 7/2003 | Cruickshank et al. ....... 709/224 |
| 2004/0006619 A1 * | 1/2004 | Syed et al. .................. 709/224 |
| 2004/0039728 A1 * | 2/2004 | Fenlon et al. .................. 707/1 |

OTHER PUBLICATIONS

G. Lanfranchi, P. Della Peruta, A. Perrone and D. Calvanese; Toward a new landscape of systems management in an autonomic computing environment', IBM Systems Journal, vol. 42, No. 1, 2003; pp. 119-128; IBM Corporation, New York.
Antonio Abbondanzio, Yariv Aridor, Ofer Biran, Liana L. Fong, German S. Goldszmidt, Richard E. Harper, Srirama M. Krishnakumar, Gregory Pruett and Ben-Ami Yassur; "Technical forum", IBM Systems Journal, vol. 42, No. 1, 2003; pp. 185-195; IBM Corporation, New York.

* cited by examiner

*Primary Examiner*—Neveen Abel Jalil
*Assistant Examiner*—Vei-Chung Liang
(74) *Attorney, Agent, or Firm*—Narendra Reddy Thappeta

(57) ABSTRACT

A monitoring system provided according to an aspect of the present invention enables a user to specify multiple resource elements as a resource pool, and view various aggregate information (e.g., sum, average) for attributes of interest for all the resource elements together. Such a feature is particularly useful in distributed environments where multiple independent resource elements need to be viewed as a single resource pool. The user is provided the flexibility to select the specific resource elements to be included in the resource pool.

20 Claims, 24 Drawing Sheets

*FIG. 6A*

[ApplicationInfo]
MOTypeId=29301
Name='SOLCpuMon'
DisplayName='Solaris CPU Monitor'
Type=Program
ExeName=com.proactivenet.monitors.CpuMon.CpuMon

[AttributeInfo]
AttrId=29300999,UsrAttrId=999,DisplayName='Instance Name',UniqueName=INSTANCE_NAME,DataType=C,AttrType=I,Label=Y,Default='Solaris CPU Monitor'

[Level 1]
MOTypeId=29301,Name='SOLCPUInfo',DisplayName='Solaris CPU',TimeOut=100,Autogenerated=N,Schedulable=Y,OS=1,AllowRemoteAgent=Y, MustRunOnAgent=Y,StatsPollPeriod=1200,StatsPollTimeout=30,ConfigPollPeriod=86400,HasMoreInfo=Y,SupportDemandPoll=Y,Version=1.0

[AttributeInfo]
Input attributes.
AttrId=29301999,UsrAttrId=999,DisplayName='Instance Name',UniqueName=INSTANCE_NAME,DataType=C,AttrType=I,Label=Y,Default='',RequiredOnCreate=N, DisplaySeqNo=1

Input/config attributes.
AttrId=29301003,UsrAttrId=3,UniqueName=CPU,DisplayName='Processor Name', DataType=C,AttrType=I,Label=N,Default='',InstanceName=Y,RequiredOnCreate=Y,HasListOfChoice=Y 605 ← AttrId=29301998,UsrAttrId=998,UniqueName=STSPOLLPERIOD,DisplayName=Statistics Poll Interval,DisplayType=Integer,IsDisplayed=Y,AttrMetaType=CNTL,AttrReferenceType=ANY,ScaleFactor=1000, InputOnCreate=Y,InputParm=Y,Autogenerated=N,Editable=Y,RequiredOnCreate=Y,Default=300

606 ← AttrId=29301021,UsrAttrId=21,UniqueName=STSPOLLTIMEOUT,DisplayName=Statistics Poll Timeout,DisplayType=Integer,IsDisplayed=Y,AttrMetaType=CNTL,AttrReferenceType=ANY,ScaleFactor=1000, InputOnCreate=Y,InputParm=Y,Autogenerated=N,Editable=Y,RequiredOnCreate=Y,Default=30

607 ← AttrId=29301995,UsrAttrId=995,UniqueName=COLLECTDATA,DisplayName=Collect Data,DisplayType=Boolean,IsDisplayed=Y,AttrMetaType=CNTL,AttrReferenceType=ANY,ScaleFactor=1000, InputOnCreate=Y,InputParm=Y,Autogenerated=N,Editable=Y,RequiredOnCreate=Y,Default=1

608 ← AttrId=29301994,UsrAttrId=994,UniqueName=SRCIP,DisplayName=Source Agent,DisplayType=MOReference,IsDisplayed=N,AttrMetaType=CFG,MOReferenceType=10000, AttrReferenceType=ANY,ScaleFactor=1000,InputOnCreate=N,Autogenerated=N,Editable=N, RequiredOnCreate=N,DisplaySeqNo=2

609 ← AttrId=29301993,UsrAttrId=993,UniqueName=PW_MON_VER,DisplayName='Monitor Version', DataType=C, AttrType=C,Label=N

```
# Output attributes.
610← AttrId=29301004,UsrAttrId=4,UniqueName=USR_CPU,DisplayName='User
      Time',AttrType=S,UOM='%',IsDefaultStats=Y,TableName=SOLCPU,ColumnName=USRTIME
611← AttrId=29301005,UsrAttrId=5,UniqueName=SYS_CPU,DisplayName='System
      Time',AttrType=S,UOM='%',IsDefaultStats=Y,TableName=SOLCPU,ColumnName=SYSTIME
612← AttrId=29301006,UsrAttrId=6,UniqueName=IO_WAIT,DisplayName='Wait
      Time',AttrType=S,UOM='%',IsDefaultStats=N,TableName=SOLCPU,ColumnName=WAITTIME
613← AttrId=29301007,UsrAttrId=7,UniqueName=INTR_RATE,DisplayName='Interrupts Rate',AttrType=S,UOM='per
      sec',IsDefaultStats=N,TableName=SOLCPU,ColumnName=INTERRUPTS
614← AttrId=29301008,UsrAttrId=8,UniqueName=SCAN_RATE,DisplayName='Scan Rate',AttrType=S,UOM='per
      sec',TableName=SOLCPU,ColumnName=SCANRATE
615← AttrId=29301009,UsrAttrId=9,UniqueName=CNTXT_SWT,DisplayName='Context Switches
      ',AttrType=S,UOM='per sec',TableName=SOLCPU,ColumnName=CNTXTSWT
616← AttrId=29301010,UsrAttrId=10,UniqueName=INVOL_CNTXT_SWT,DisplayName='Involuntary Context
      Switches',AttrType=S,UOM='per sec',IsDefaultStats=Y,TableName=SOLCPU,ColumnName=INVOLCNTXTSWT
617← AttrId=29301011,UsrAttrId=11,UniqueName=SYS_CALLS,DisplayName='System Calls',AttrType=S,UOM='per
      sec',IsDefaultStats=N,TableName=SOLCPU,ColumnName=SYSCALLS
618← AttrId=29301012,UsrAttrId=12,UniqueName=INTR_THREAD,DisplayName='Interrupts as
      Threads',AttrType=S,UOM='per sec',IsDefaultStats=N,TableName=SOLCPU,ColumnName=INTRTHREAD
619← AttrId=29301013,UsrAttrId=13,UniqueName=CROSS_CALLS,DisplayName='Cross Calls ',AttrType=S,UOM='per
      sec',IsDefaultStats=N,TableName=SOLCPU,ColumnName=CROSSCALLS
620← AttrId=29301014,UsrAttrId=14,UniqueName=MGR_THREAD,DisplayName='Thread Migrations
      ',AttrType=S,UOM='per sec',IsDefaultStats=N,TableName=SOLCPU,ColumnName=MGRTHREAD
621← AttrId=29301015,UsrAttrId=15,UniqueName=TOT_CPU,DisplayName='Total
      Time',AttrType=S,UOM='%',IsDefaultStats=Y,TableName=SOLCPU,ColumnName=TOTTIME
```

*FIG. 8A*

```
# File     : _SOLCPU1.meta
# Description : Metafile for _SOLCPU1
# Date     : Fri Apr 08 11:09:19 GMT+05:30 2005

[ApplicationInfo]
801← MOTypeId=501017
802← Name='P_SOLCPU1'
803← DisplayName='Patent Test'

# Input Predefined attributes
810← AttrId=501017999,UsrAttrId=999,UniqueName=INSTANCE_NAME,DisplayName='Instance Name',DataType=C,AttrType=I,Label=Y, Default='',RequiredOnCreate=N, DisplaySeqNo=1
811← AttrId=501017070,UsrAttrId=70,UniqueName=TARGETIP,DisplayName='Target IP/Host Name',DataType=I,AttrType=H,Label=N,InstanceName=N,DisplayType=IPAddress,Default=-1062731409,DisplaySeqNo=3,RequiredOnCreate=N
812← AttrId=501017005,UsrAttrId=5,UniqueName=PORT,DisplayName='Port',DataType=C,AttrType=H,Label=N,InstanceName=N,Default='2638',DisplaySeqNo=52,RequiredOnCreate=N
813← AttrId=501017006,UsrAttrId=6,UniqueName=USER_NAME,DisplayName='User Name',DataType=C,AttrType=H,Label=N,InstanceName=N,Default='dba', IsDisplayed=N,DisplaySeqNo=53,RequiredOnCreate=N
814← AttrId=501017007,UsrAttrId=7,UniqueName=PASSWORD,DisplayName='Password',DataType=C,AttrType=H,Label=N,InstanceName=N,Default='f39/f39/f39/fwAAAAg+FiRO8uncXwAAAAi+UU7g6VBFSwAAABQZ5/wkO28JqwnMiElhxX5ymeBotA==',DisplaySeqNo=54,RequiredOnCreate=N,IsDisplayed=N
815← AttrId=501017008,UsrAttrId=8,UniqueName=MOTYPEID,DisplayName='MO Type Id ',AttrType=H,DataType=C,Label=N,InstanceName=N,Default=29301,DisplaySeqNo=54,RequiredOnCreate=N
816← AttrId=501017009,UsrAttrId=9,UniqueName=DBNAME,DisplayName='Database Name',AttrType=H,DataType=C,Label=N,InstanceName=N,,Default=storm_kabini,DisplaySeqNo=54,RequiredOnCreate=N
```

Input attributes
834← Attrld=501017020,UsrAttrld=20,UniqueName=STATS_ATTRIB01,DisplayName='SUM_System Time',DataType=C,AttrType=C,AttrType=H,Label=N,Default=' +SUM+System Time;%;true;1.0',InstanceName=N,RequiredOnCreate=N,HasListOfChoice=N 835← Attrld=501017021,UsrAttrld=21,UniqueName=STATS_ATTRIB02,DisplayName='AVERAGE_System Calls',DataType=C,AttrType=H,Label=N,Default=' +AVERAGE+System Calls;per sec;false;1.0',InstanceName=N,RequiredOnCreate=N,HasListOfChoice=N

Output Config attributes
841← Attrld=501017993,UsrAttrld=993,UniqueName=PW_MON_VER,DisplayName='Monitor Version',DataType=C,AttrType=C,Label=Y 842← Attrld=501017004,UsrAttrld=4,UniqueName=COUNT,DisplayName='Total Instances',DataType=C,AttrType=C,Label=Y

Output Stat attributes
851← Attrld=501017072,UsrAttrld=72,UniqueName=STATS01,DisplayName='SUM_System Time',AttrType=S,UOM='%',IsDefaultStats=Y,TableName=_SOLCPU1,ColumnName=STATS01,UseNormalDistribution=Y,IsDisplayed=Y 852← Attrld=501017073,UsrAttrld=73,UniqueName=STATS02,DisplayName='AVERAGE_System Calls',AttrType=S,UOM='per sec',IsDefaultStats=N,TableName=_SOLCPU1,ColumnName=STATS02,UseNormalDistribution=Y,IsDisplayed=Y

*FIG. 8B*

```
# Input Control attributes
861←Attrld=501017998,UsrAttrId=998,UniqueName=STSPOLLPERIOD,DisplayName='Statistics Poll
    Interval',DisplayType=Integer,IsDisplayed=Y,AttrMetaType=CNTL,AttrReferenceType=ANY,ScaleFactor=1
    000,InputOnCreate=Y,InputParm=Y,Autogenerated=N,Editable=Y,RequiredOnCreate=Y,Default=900
862←Attrld=501017995,UsrAttrId=995,UniqueName=COLLECTDATA,DisplayName=Collect
    Data,DisplayType=Boolean,IsDisplayed=Y,AttrMetaType=CNTL,AttrReferenceType=ANY,ScaleFactor=100
    0,InputOnCreate=Y,InputParm=Y,Autogenerated=N,Editable=Y,RequiredOnCreate=Y,Default=1
863←Attrld=501017994,UsrAttrId=994,UniqueName=SRCIP,DisplayName=Source
    Agent,DisplayType=MOReference,IsDisplayed=N,AttrMetaType=CFG,MOReferenceType=10000,AttrRefere
    nceType=ANY,ScaleFactor=1000,InputOnCreate=N,Autogenerated=N,Editable=N,RequiredOnCreate=N
864←Attrld=501017997,UsrAttrId=997,UniqueName=CFGPOLLPERIOD,DisplayName=Configuration Poll
    Interval,DisplayType=Integer,IsDisplayed=Y,AttrMetaType=CNTL,AttrReferenceType=ANY,ScaleFactor=10
    00,InputOnCreate=Y,InputParm=N,Autogenerated=Y,Editable=Y,RequiredOnCreate=Y,Default=7200
865←Attrld=501017991,UsrAttrId=991,UniqueName=CFGPOLLTIMEOUT,DisplayName=Configuration Poll
    Timeout,DisplayType=Integer,IsDisplayed=Y,AttrMetaType=CNTL,AttrReferenceType=ANY,ScaleFactor=1
    000,InputOnCreate=Y,InputParm=Y,Autogenerated=Y,Editable=Y,RequiredOnCreate=Y,Default=20
866←Attrld=501017010,UsrAttrId=10,UniqueName=STSPOLLTIMEOUT,DisplayName='Statistics Poll
    Timeout',DisplayType=Integer,IsDisplayed=Y,AttrMetaType=CNTL,AttrReferenceType=ANY,ScaleFactor=1
    000,InputOnCreate=Y,InputParm=Y,Autogenerated=N,Editable=Y,RequiredOnCreate=Y,Default=120
867←Attrld=501017013,UsrAttrId=13,UniqueName=RETRY_COUNT,DisplayName='Retry
    Count',DisplayType=Integer,IsDisplayed=Y,AttrMetaType=CNTL,AttrReferenceType=ANY,ScaleFactor=10
    00,InputOnCreate=Y,InputParm=Y,Autogenerated=N,Editable=Y,RequiredOnCreate=Y,Default=3
868←Attrld=501017014,UsrAttrId=14,UniqueName=RETRY_DELAY,DisplayName='Retry
    Delay',DisplayType=Integer,IsDisplayed=Y,AttrMetaType=CNTL,AttrReferenceType=ANY,ScaleFactor=100
    0,InputOnCreate=Y,InputParm=Y,Autogenerated=N,Editable=Y,RequiredOnCreate=Y,Default=20
```

Add PatentTest

Configuration | Control

Collect Data ✓
Configuration Poll Interval * [2hr ▶] — 1016
Configuration Poll Timeout * [20 sec ▶] — 1017
Statistics Poll Interval * [15 min ▶] — 1018
Statistics Poll Timeout * [2 min ▶] — 1019

Help  Finish  Next  Add

Skip  Close

MONITORING SEVERAL DISTRIBUTED RESOURCE ELEMENTS AS A RESOURCE POOL

RELATED APPLICATION(S)

The present application is related to and claims priority from the co-pending India Patent Application entitled, "Monitoring Several Distributed Resource Elements as a Resource Pool", Serial Number: 599/CHE/2005, Filed: 19 May 2005, naming the same inventors as in the subject patent application, and is incorporated in its entirety herewith.

The present application is also related to co-pending U.S. application Ser. No. 10/452,134; Filed: Jun. 3, 2003, entitled, "Network Management System to Monitor Managed Elements", which is incorporated in its entirety herewith.

BACKGROUND OF THE INVENTION

1. Field of the Invention

The present invention relates to network management systems, and more specifically to a method and apparatus for facilitating a user/administrator to monitor several distributed resource elements as a resource pool.

2. Related Art

A resource element generally refers to an entity which is used in computation or communication. Examples of resource elements include memories, processors, processes, etc. Management systems are often provided to monitor the usage and status of such resource elements.

Multiple resource elements are often used as resource pools in networked systems. For example, a front end machine may distribute web page requests to multiple web servers, and the web servers could together be viewed as a resource pool since each web page request can be served potentially by any of the web servers.

Similarly, virtual computing environments (such as in utility computing and grid computing) are evolving which view several distributed resource elements (provided in physically different units) as a resource pool in performing a desired computation or providing a desired service.

There is a general need to simplify management of such resource pools in network management systems.

BRIEF DESCRIPTION OF THE DRAWINGS

The present invention will be described with reference to the accompanying drawings, wherein:

FIGS. 6A-6C depict the content of meta files illustrating the definition of a element monitor type used in an embodiment.

FIGS. 8A-8C depict the content of a meta file illustrating the definition of a pool monitor type used in an embodiment.

FIGS. 10A-10C are display screens used by an administrator to associate a newly defined resource pool with a newly defined pool monitor type in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

A network management system according to an aspect of the present invention enables an administrator (or user) to specify several distributed resource elements as a resource pool and various attributes of interest for the resource pool. The network management system monitors the individual resource elements periodically to determine the values corresponding to the specified attributes and displays the aggregated information for each attribute of interest. The user may specify the specific aggregate information (e.g., mean, median) to display as well.

The management of several applications that operate by using resource pools may be simplified as a result.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the invention.

2. Example Environment

Figure 1:
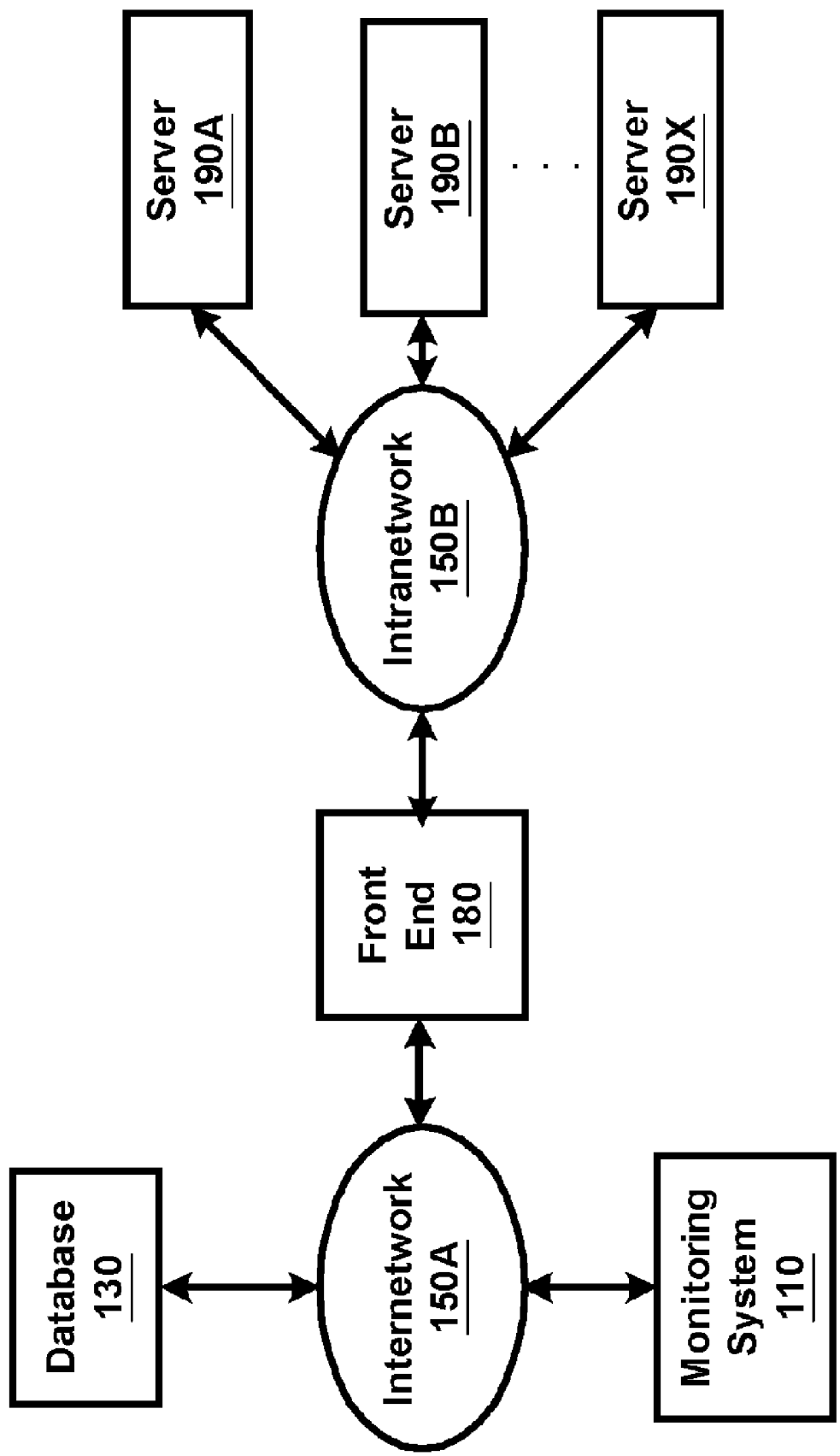
FIG. 1 is a block diagram illustrating an example environment in which various aspects of the present invention can be implemented.

FIG. 1 is a block diagram illustrating an example environment in which various aspects of the present invention can be implemented. The environment is shown containing monitoring system 110, database 130, inter-network 150A, intra-network 150B, and servers 190-A through 190-X. It should be appreciated that only a few representative systems and components are shown in FIG. 1 for illustration. However, typical environments contain several more (types) systems. Each system of FIG. 1 is described below in further detail.

Servers 190A-190X represent example resource elements which are physically distributed, and sought to be monitored as a resource pool according to various aspects of the present invention. All the servers are shown connected to intra-network 150B. Front-end 180 receives various requests (e.g., HTTP requests) from inter-network 150A, and distributes the requests to one of servers 190A-190X, for example, according to a known approach. Accordingly, servers 190A-190X together may be viewed as a resource pool.

Monitoring system 110 enables a user to monitor the group of servers 190A-190X as a single managed element (i.e., a resource pool) according to various aspects of the present invention. Monitoring system 110 may monitor individual resource elements and store the monitored values in database 130. The manner in which monitoring system 110 may provide such features are described below in further detail.

3. Monitoring Resource Pool

Figure 2:
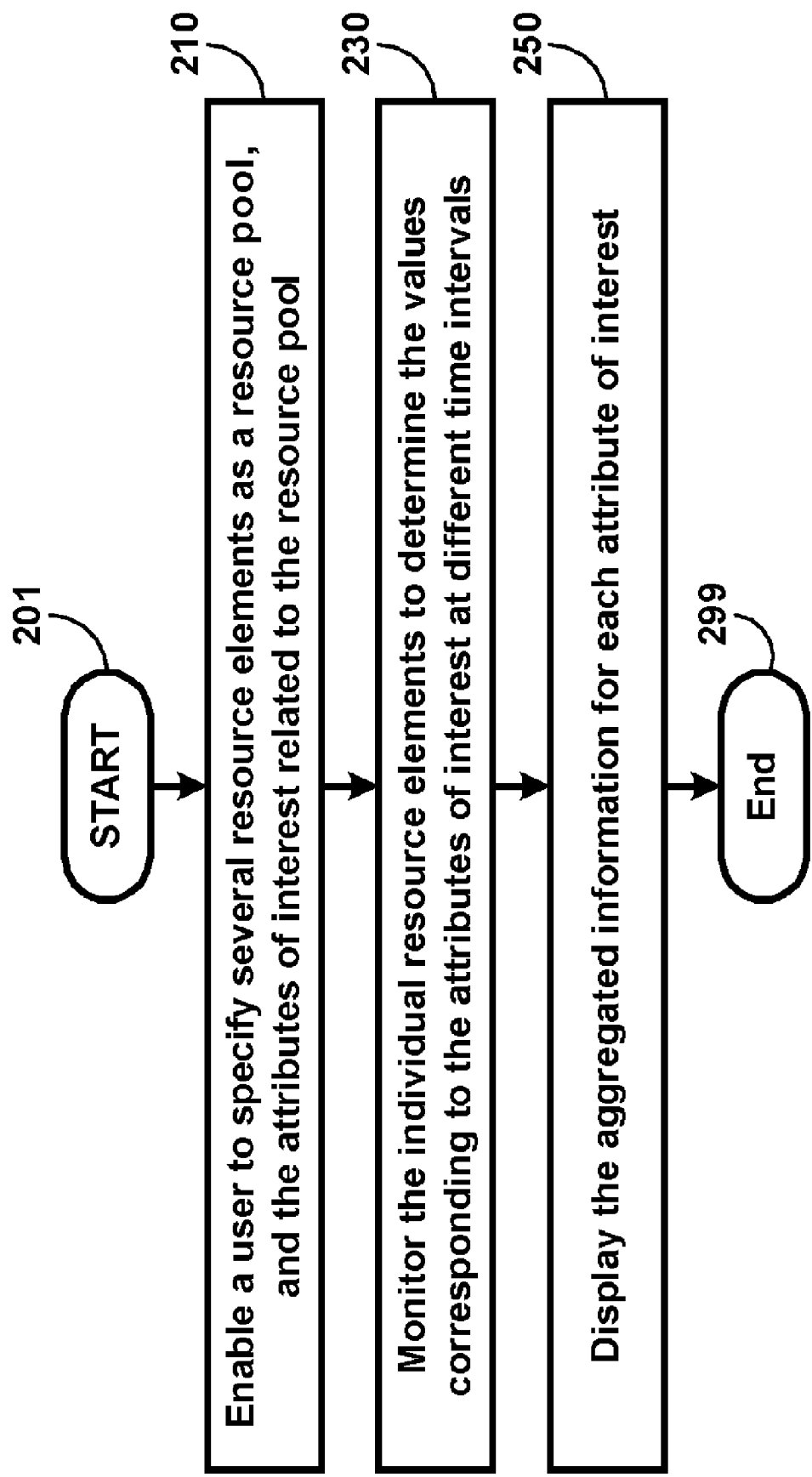
FIG. 2 is a flow chart illustrating the manner in which multiple resource elements can be monitored as a resource pool according to various aspects of the present invention.

FIG. 2 is a flowchart illustrating the manner in which a monitoring system may enable multiple resources to be monitored as a single resource pool according to various aspects of the present invention. The flowchart is described below with respect to FIG. 1 for illustration. However, the features can be implemented in other environments also, as will be apparent to one skilled in the relevant arts by reading the disclosure provided herein. The flowchart begins in step 201, in which control passes to step 210.

In step 210, monitoring system 110 enables a user to specify a resource pool containing several resource elements, and the attributes of interest related to the resource pool. Various approaches may be used in seeking the related inputs from the user. An example implementation is described below.

In step 230, monitoring system 110 monitors the individual resource elements to determine the values corresponding to the attributes of interest at different time intervals. The intervals can be different for different attributes and at least some of the intervals can be specified by the user.

In step 250, monitoring system 110 displays the aggregated information for each attribute of interest. The information may also be displayed using one of various approaches, and an example approach is illustrated in sections below. Examples of the aggregated information include statistical parameters such as mean, median, and variance. The user may be provided the option of specifying the specific aggregated information of interest as well. The method ends in step 299.

Thus, by using approaches according to FIG. 2, several resource elements can be monitored together as a resource pool. Monitoring system 110 can be implemented using different approaches to provide the features of FIG. 2. An example implementation of monitoring system 110 is described below with reference to FIGS. 3 And 4.

4. Monitoring System

Figure 3:
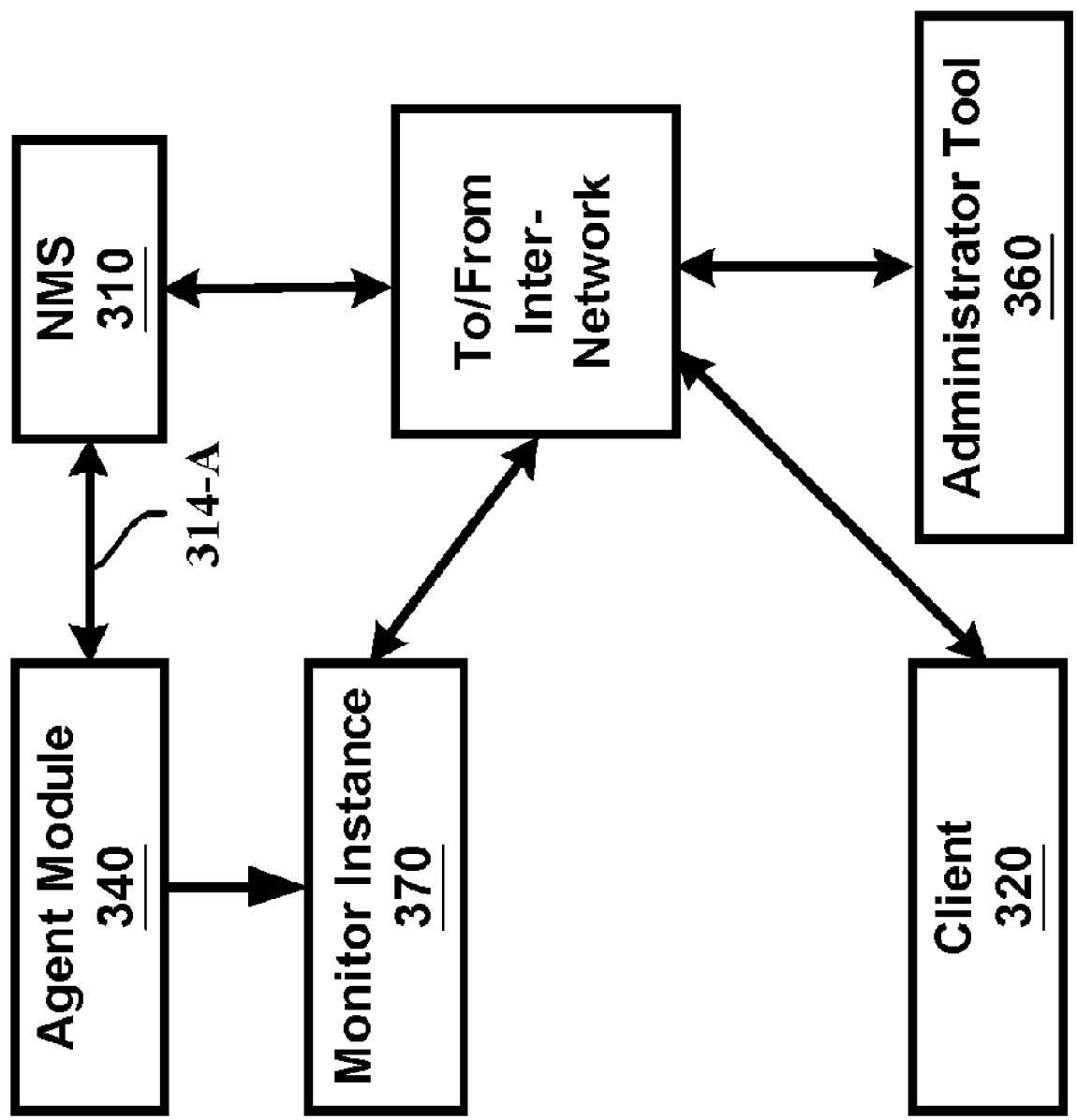
FIG. 3 is a block diagram illustrating the details of a resource pool monitoring system in an embodiment of the present invention.

FIG. 3 is a block diagram illustrating the details of monitoring system 110 in one embodiment. Monitoring system 110 is shown containing network management station (NMS) 310, client 320, agent module 340, administrator tool 360, and monitor instance 370. Each block is described below in further detail.

Monitor instance 370 represents an entity (e.g., a process executing on a system) which actively samples the status values of various attributes of interest earlier specified by the user. The sampled values may be sent via network 150A to database 130. Monitor instance 370 may be instantiated/created by using agent module 340, as described below.

NMS 310 enables a user to define various monitor types. As relevant to the features of the present invention, a user may specify the type of resource (e.g., CPUs, processes, servers, etc.) and the type of aggregate information that would be of interest when the elements of the resource type are viewed as a resource pool. NMS 310 may receive sampled values from monitor instance 370 and store the same in database 130. In addition, NMS 310 enables a user to view aggregate information related to various resource pools configured earlier.

Agent module 340 facilitates the instantiation of monitor instances using the monitor types defined using NMS 310. In addition, agent module 340 may facilitate tasks such as changing of control parameters (e.g., polling frequency), forwarding the data points polled for various attributes, etc. To provide the above features, each agent module is provided the ability (compatible network protocol, medium interface, etc.) to communicate with NMS 310.

Administrator tool 360 is used by an administrator/user to configure and instantiate various monitor instances. Administrator tool 360 may be integrated into NMS 310 as one unit. However, for ease of administration, administration tool may be provided from various client systems (320). The manner in which a user may define monitor types and instantiate new monitor instances according to various aspects of the present invention, is described below in further detail.

Client 320 provides a suitable user interface using which users may view the aggregate information related to resource pools monitored according to various aspects of the present invention. NMS 310 may provide the corresponding information using a suitable user interface. The description is continued with respect to an architecture view of an example embodiment of NMS 310.

5. Network Management Station (NMS)

Figure 4:
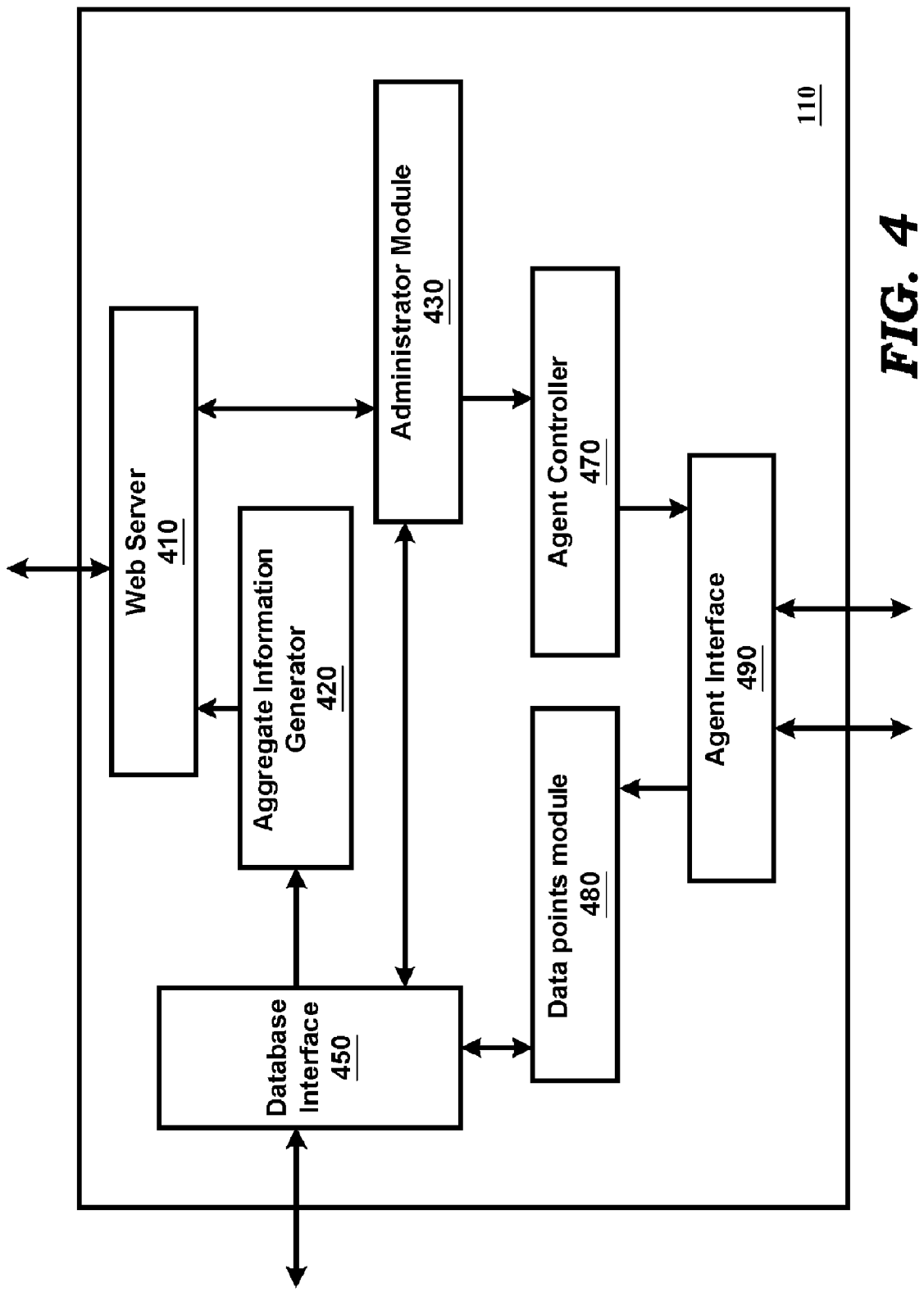
FIG. 4 is a block diagram illustrating the details of a network management station in an embodiment of the present invention.

FIG. 4 is a block diagram illustrating the details of NMS 310 in one embodiment. NMS 310 is shown containing web server 410, aggregate information generator 420, administrator module 430, database interface 450, agent controller 470, data points module 480, and agent interface 490. Each component described below in further detail.

Web server 410 provides interface to client 320 and administrator tool 360 to interact with other modules in NMS 310. In an embodiment, a request for a web page is received in the form of a URL and associated parameters, and web server 410 communicates with an application server (not shown) to provide the appropriate interface for client 320 and administrator tool 360. The application server may be implemented to contain aggregate information generator 420 and administrator module 430. Web server 410 and the application server may be implemented using products available in the market-place as will be apparent to one skilled in the relevant arts.

Administrator module 430 provides appropriate interface for administrator tool 360 to enable an administrator to define, configure and instantiate monitor instances according to various aspects of the present invention. Administrator module 430 generates the appropriate database schemas, and configures database 130 corresponding to any monitor types/instances defined according to various aspects of the present invention. In general, administrator module 430 may be used to specify the manner in which data points related to an attribute need to be displayed, and aggregate information generator 420 displays the data points accordingly.

Aggregate information generator 420 retrieves from database 130 (by interfacing through database interface 450) various data points (sampled values) corresponding to attributes sought to be monitored, and displays the corresponding aggregate information. The aggregate information is first computed using the sampled values, data representing the requested graphs and reports (of the aggregate information) may be generated, and provided to web server 410 for display in the form of web pages. The operation of aggregate information generator 420 and administrator module 430 is described with reference to example(s) below.

Data points module 480 receives various sampled values related to attributes (of individual monitored elements) being monitored by the corresponding monitor instances, and determines the manner in which the data points need to be processed. At least some of the data points may be stored in database 130 by communicating with database interface 450. The number of data points stored may be reduced and/or alarms logged, for example, as described in U.S. Pat. No. 6,453,346 issued to Garg et al, which is incorporated in its entirety into the present application.

Agent controller 470 operates under the control of administrator tool 360 (via administrator module 430) to instantiate various monitor instances, and to provide the appropriate configuration parameters. In general, each monitor instance may be provided information indicating the specific attributes to be monitored, polling frequency, timeout value for each poll, etc., in addition to the program logic enabling the monitor instance to poll the device for the data point. Agent interface 490 enables communication with each of the monitor instances according to the specific medium/protocol using which the monitor instance can be contacted.

The description is continued with reference to the manner in which several aspects of the present invention may be implemented in the embodiment(s) described above. In particular, the description is continued with respect to the manner in which a user may specify information of interest related to multiple resource elements according to an aspect of the present invention.

6. Specifying Information of Interest Related to Resource Elements

Figure 5:
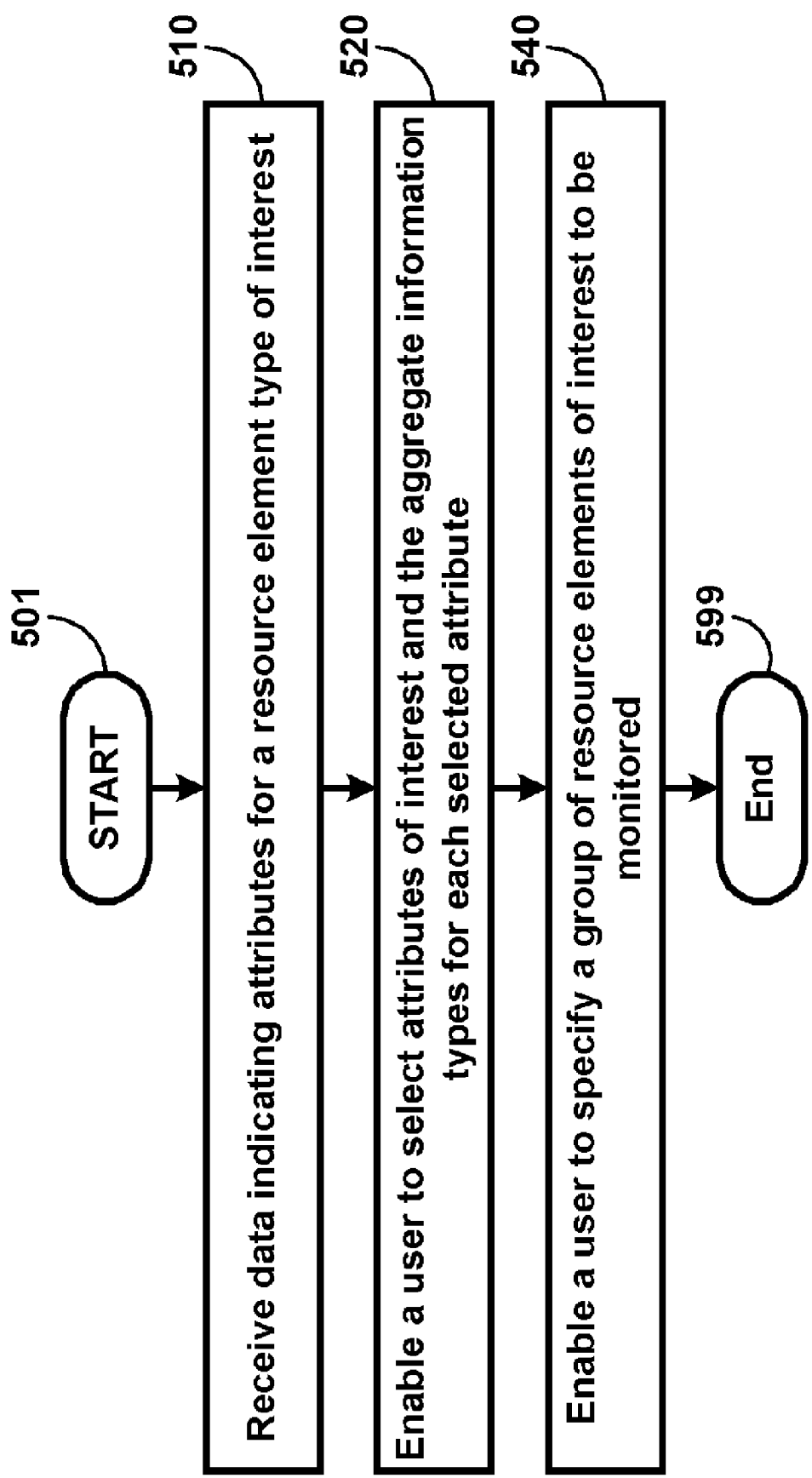
FIG. 5 is a flow chart illustrating the manner in which multiple resource elements can be defined as a resource pool in an embodiment of the present invention.

FIG. 5 is a flowchart illustrating the manner in which a user may specify multiple resource elements as forming a resource pool and also the specific attributes of interest with respect to the resource pool. The flowchart is described with respect to the Figures described above merely for illustration. However, the features can be implemented in other environments as well. The flowchart begins in step 501 in which control transfers to step 510.

In step 510, administrator module 430 receives data indicating attributes for a resource element type of interest. In an embodiment, the user is provided a list of the resource element types supported by the monitoring system, and the user may select the specific resource element type of interest. Monitoring system 110 then displays the attributes that can be monitored for the indicated resource element type (in the context of a resource pool).

In step 520, administrator module 430 enables a user to select attributes of interest (for the resource element type of interest) and the aggregate information types for each selected attribute. A convenient graphical user interface (GUI) may be provided for such a selection.

In step 540, agent module 340 enables a user to specify a group of resource elements of interest to be monitored. NMS 310 (or administrator module 430 therein) may also be notified of the user specification, which then causes instantiation of the corresponding monitor instance, as well as display of the requested aggregate information. The flowchart ends in step 599.

Accordingly, the approaches described above enable effective monitoring of resource pools. The description is continued with respect to the manner in which the steps/approaches noted above are implemented in an example embodiment.

In that embodiment, the attributes that can be monitored are specified in an element monitor type for each resource element type. A pool monitor type is then conveniently created for the resource pool type, such that different groups of resource elements can be defined as different resource types (as would be desired by administrators or users). According the manner in which a pool monitor type can be defined from a element monitor type, is described below first.

7. Defining a Pool Monitor Type

FIGS. 6A-6C together represent the content of a text file depicting the attributes associated with an element monitor type for a Solaris CPU (available from Sun Microsystems, Sun Microsystems Inc, 4150 Network Circle, Santa Clara, Calif. 95054 Phone: (800) 801-7869). The contents there are used to illustrate the manner in which a pool monitor type can be defined for several such CPUs together.

It should be understood that the element monitor type could contain several more lines, but only lines relevant to implementation of various aspects of the present invention are described for conciseness. In addition, some of the labels are self-explanatory and are also not described for conciseness.

Line 601 includes a unique identifier (which would be useful in various programming contexts, as would be apparent to one skilled in the relevant arts) for the element monitor type of FIGS. 6A-6C. Line 602 indicates that the type of the element monitor as 'SOLCpuMon' (i.e., related to Solaris CPU monitor), while line 603 indicates the display name for the monitor type as 'Solaris CPU Monitor'.

Lines 604-609 indicate some of the attributes that need to be configured for a Solaris CPU resource element before monitoring some of the attributes of lines 610-621. Lines 610 to 621 indicate some of the attributes which can be monitored for a Solaris CPU. Line 610 provides a unique attribute identifier (29301004) for the attribute (which may be constructed from MOtypeid and the UsrAttrId), a display name (displayed in user interface) of 'User Time', unit of measurement (UOM) as percentage usage, etc.

With reference to line 610, variable entitled 'AttrID' (29301004) is unique across all attributes of all monitor types within NMS 310, and is obtained by concatenating the value of a second variable 'UsrAttrID' (4 this case) with MOTypeid value (29301) from line 601. The values may be assigned using some simple scheme (e.g., lowest unassigned value in a certain range of numbers). NMS 310 uses AttrID as a unique identifier for the attribute within the system.

Variable entitled 'DisplayName' contains display string for the attribute ('User Time' in this case). Variable entitled 'UniqueName' contains a unique name value for the attribute ('USR_CPU' in this case). The display name is not necessarily unique, so either the AttrID value or the unique name value may be used to distinguish one attribute from another. Unique name value is intended to be in human readable form, whereas AttrID is not easily comprehensible since it is intended for computation purposes (e.g., as a key in Database 130). Variable entitled 'AttrType' specifies type of this attribute (statistical type in this case). This is set to stats since it is an output attribute used to record the counter value obtained in a monitor poll.

Variable entitled 'UOM' specifies the units of measurement for this attribute ('%' in this case). Variable entitled 'IsDefaultStats' specifies if this is a default counter for which data is collected (yes in this case). Variable entitled 'TableName' gives the database table name for this attribute ('SOL-CPU' in this case). The database table name is derived from the unique name for this monitor type (line 602). Variable entitled 'ColumnName' gives the column name for this attribute ('USRTIME' in this case). The remaining lines 611-621 may also be described similarly for other attributes monitored by the Solaris CPU Monitor.

Figure 7A:
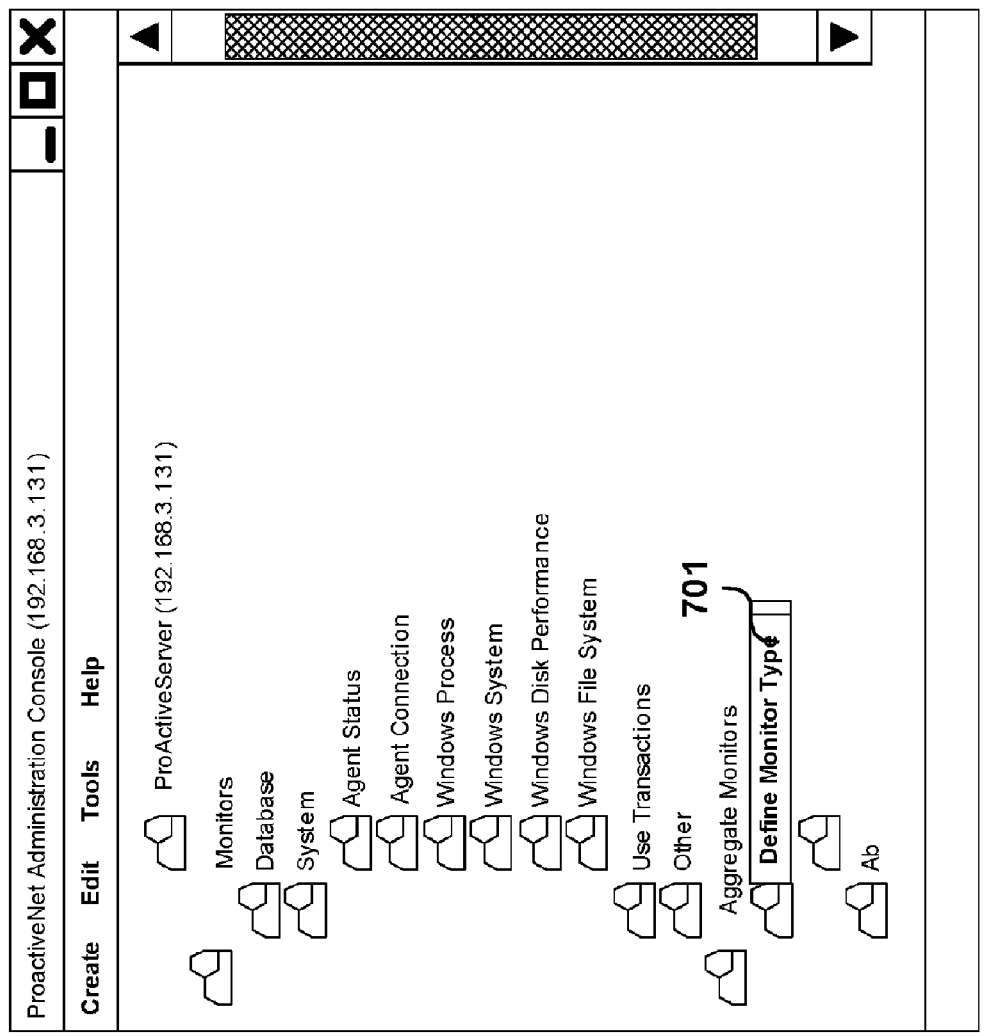
FIG. 7A-7C contain display screens using which an administrator or user can define a new monitor type in an embodiment.
Figure 7B:
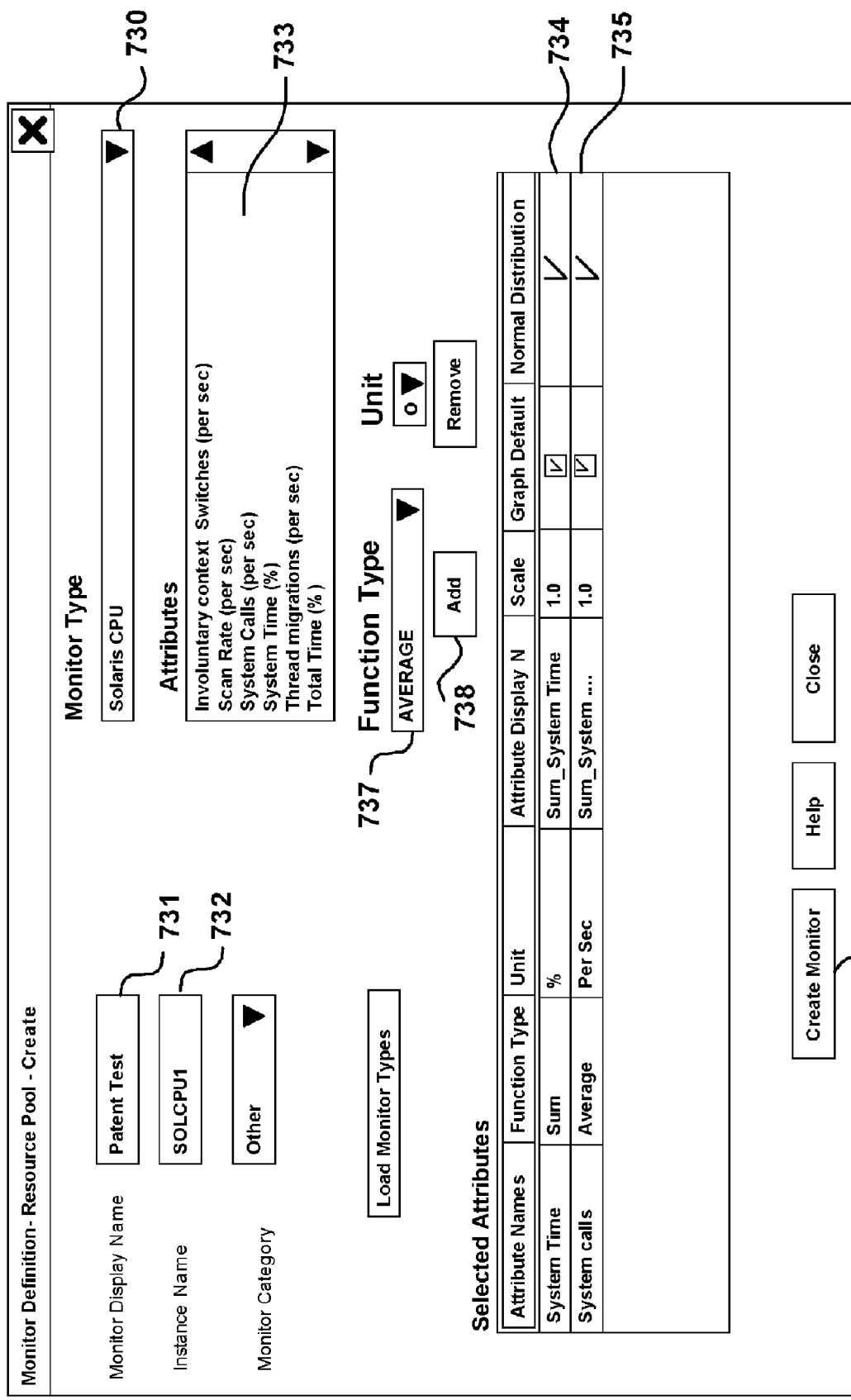
Figure 7C:
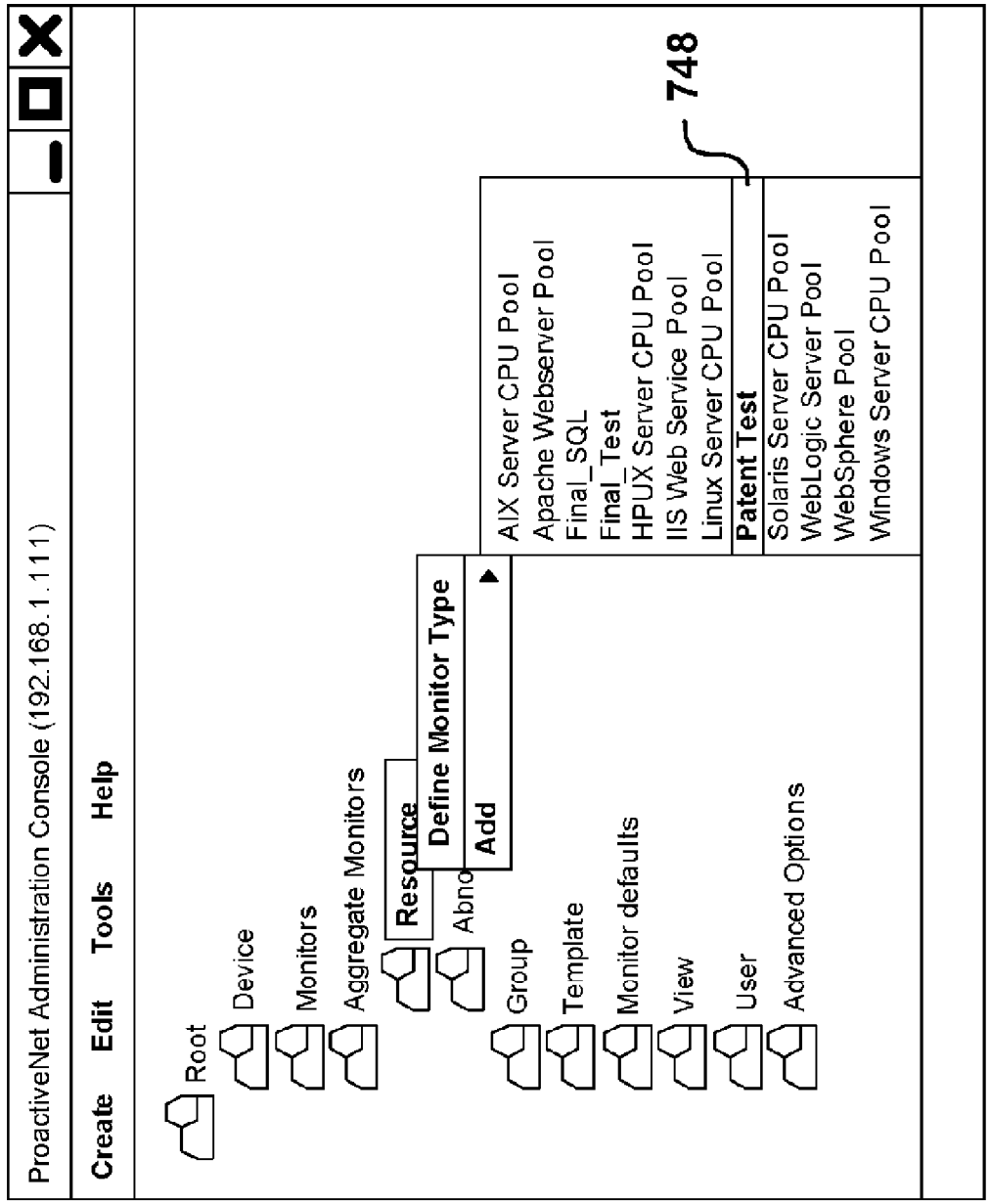

FIGS. 7A-7C illustrate the manner in which attributes of interest can be selected while defining a pool monitor. The list of attributes defined for the Solaris CPU monitor (lines 610-621) are used for illustration. Each of the FIGS. 7A-7C is described briefly below.

FIG. 7A illustrates the manner in which an administrator initiates definition of a pool monitor type. In general, new monitor types are added using administrator tool 360 (via administrator module 430). As can be observed at 701, group 701 is shown for all pool monitor types defined. By appropriate user action (e.g., right click, double click), the screen of FIG. 7B is displayed to enable/facilitate definition of a new pool monitor type.

FIG. 7B is shown containing a form which is used to create a pool monitor for resource elements of type Solaris CPU. List box 730 (which generally lists all available choices, and enables selection of one of the choices) indicates that the user has chosen to create a new pool monitor for the resource elements of type Solaris CPU.

Entry 731 indicates that the display name specified (by user) for the new pool monitor type is 'Patent Test', while the value entered (by administrator or user) in entry 732 indicates that the name of the new monitor type is 'SOLCPU1'.

List box 733 displays the attributes corresponding to the monitor type selected in list box 730. Thus, list box 733 contains attributes of the Solaris CPU monitor (as defined in lines 610-621). The user selects an attribute of interest using list box 733, an aggregation information of interest (at list box 737), and presses add button 738 to cause the corresponding information to be added to the table below (shown containing rows 734 and 735, described below).

Rows 734 and 735 indicate that attributes System Time and System Calls are to be monitored in each resource element, and the corresponding aggregation information of interest for the attributes is 'SUM' and 'AVERAGE' respectively.

Selecting 'Create Monitor' (736) creates the pool monitor type entitled SOLCPU1, consistent with the definitions above of FIG. 7B. The administrator may verify whether the monitor type 'Patent Test' has been created by verifying the list of monitors in list 748 of FIG. 7C.

In an embodiment, a pool monitor type is also represented similar to the convention of FIG. 6A-6C (corresponding to element monitor type). The corresponding text created is described below with reference to FIGS. 8A-8C.

8. Content Representing a Pool Monitor Type

FIGS. 8A-8C together depict the contents of a (portion of) text file indicating the attributes of interest associated with a pool monitor type. The pool monitor type corresponds to the one created with respect to the description of FIGS. 6A-6C and 7A-7C. The contents of FIGS. 8A-8C are described below in further detail.

Line 801 indicates that the unique identifier for the pool monitor type defined from the element monitor type for 'Solaris CPU' as 501016. Lines 802 and 803 respectively indicate that the name of the pool monitor is 'SOLCPU1' and display name is 'Patent Test' (consistent with the values entered in entries 732 and 731 respectively).

Lines 810-816 contain definitions of some pre-defined input attributes that are used in creating an actual instance of this pool monitor type ('PatentTest', as seen in line 748 of FIG. 7C). Line 810 corresponds to attribute 'Instance_Name' that is displayed as field 1011 in FIG. 10A. Variable entitled 'AttrID' (501017999 in this case) has a unique value across all attributes of all monitor types within NMS 310, and is obtained by concatenating the value of a second variable 'UsrAttrID' (999 in this case) with MOTypeid value (501017) from line 801. The values may be assigned using some simple scheme (e.g., lowest unassigned value in a certain range of numbers). NMS 310 may use AttrID as a unique identifier for the attribute within the system.

Variable entitled 'DisplayName' contains display string for the attribute ('Instance Name' in this case). Variable entitled 'UniqueName' contains a unique name value for the attribute ('INSTANCE_NAME' in this case). The display name is not necessarily unique, so either the AttrID value or the unique name value may be used to distinguish one attribute from another. Unique name value is intended to be in human readable form, whereas AttrID is not easily comprehensible since it is intended for computation purposes (e.g., as a key in Database 130).

Variable entitled 'DataType' specifies data type of this attribute (character string in this case). Variable entitled 'AttrType' specifies type of this attribute (input in this case). Variable entitled 'Label' specifies if this attribute will be displayed as a label (yes in this case). Variable entitled 'Default' specifies the default value to be displayed in input field 1011 of FIG. 10A (no default value in this case). Variable entitled 'DisplaySeqNo' specifies the order in which this attribute is displayed (first in this case, which is the position of field 1011 in FIG. 10A). Variable entitled 'RequiredOnCreate' specifies if this is a required or optional input to create the monitor instance (no in this case). Note that if user/administrator does not provide an instance name, NMS 310 may internally assign an instance name based on other available attributes, such as Monitor Display Name (line 731) or Monitor Name (line 732).

Lines 834 and 835 contain definition of (the two) attributes of interest which are monitored in each resource element contained in a resource pool. It may be appreciated that the attributes of interest are 'SUM_System Time' and 'AVERAGE_System Calls' in accordance with the attributes selected while creating the pool monitor type (indicated by lines 734 and 735) respectively.

Line 834 is used as an example to describe the significant variables for a typical attribute which is selected by the user/administrator for each resource element contained in a resource pool. Variable entitled 'AttrID' (501017020 in this case) is unique across all attributes of all monitor types within NMS 310, and is obtained by concatenating the value of a second variable 'UsrAttrID' (020 in this case) with MOTypeid value (501017) from line 801. The values may be assigned using some simple scheme (e.g., lowest unassigned value in a certain range of numbers). NMS 310 uses AttrID as a unique identifier for the attribute within the system.

Variable entitled 'DisplayName' contains display string for the attribute ('SUM_System Time' in this case). Variable entitled 'UniqueName' contains unique name value for the attribute ('STATS_ATTRIB01' in this case). The display name is not necessarily unique, and thus either the AttrID value or the unique name value may be used to distinguish one attribute from another. Unique name value is intended to be in human readable form, whereas AttrID is not easily comprehensible since it is intended for computation purposes (e.g., as a key in Database 130).

Variable entitled 'DataType' specifies data type for this attribute (character in this case). Variable entitled 'AttrType' specifies type of this attribute (hidden in this case). This is set to hidden since it is an input used to only define the attribute; it does not output the value obtained in a monitor poll—the value is actually output using a corresponding output attribute described later (lines 851-852 in FIG. 8B). Variable entitled 'Default' stores a composite value to indicate all the properties of this attribute as selected in line 734 of FIG. 7B ('+SUM+System Time; %; true; true; 1.0' in this case).

With reference to line 734, the value indicates that the attribute has 'Function Type' property (second column) equal to 'SUM', 'Attribute Names' property (first column) equal to 'System Time', unit of measure equal to '%' (third column), default graph option set to 'true' (sixth column), normal data distribution option set to 'true' (seventh column), and scale factor equal to '1.0' (fifth column).

Lines 841-842 contain definitions of some pre-defined configuration attributes used to display aggregate information related to the resource pools being monitored. Line 841 corresponds to column 'Monitor Version' that is displayed in row 1190 of FIG. 11B. Variable entitled 'AttrID' (501017993 in this case) has a unique value across all attributes of all monitor types within NMS 310, and is obtained by concatenating the value of a second variable 'UsrAttrID' (993 in this case) with the MOTypeid value (501017) in line 801. The values may be assigned using some simple scheme (e.g., lowest unassigned value in a certain range of numbers). NMS 310 may use AttrID as a unique identifier for the attribute within the system.

Variable entitled 'DisplayName' contains display string for the attribute ('Monitor Version' in this case). Variable entitled 'UniqueName' contains a unique name value for the attribute ('PW_MON_VER' in this case). The display name is not necessarily unique, so either the AttrID value or the unique name value may be used to distinguish one attribute from another. Unique name value is intended to be in human readable form, whereas AttrID is not easily comprehensible since it is intended for computation purposes (e.g., as a key in Database 130).

Variable entitled 'DataType' specifies the data type of this attribute (character string in this case). Variable entitled 'AttrType' specifies type of this attribute (configuration in this case). Variable entitled 'Label' specifies if this attribute will be displayed as a label (yes in this case). Note that row 1190 of FIG. 11B also displays other information related to the resource pools being monitored, such as Total Instances (line 842 in FIG. 8B), Instance Name (line 1011 in FIG. 10A), Group (line 1012 in FIG. 10A), and Collect Data (line 862 in FIG. 8C).

Figure 11A:
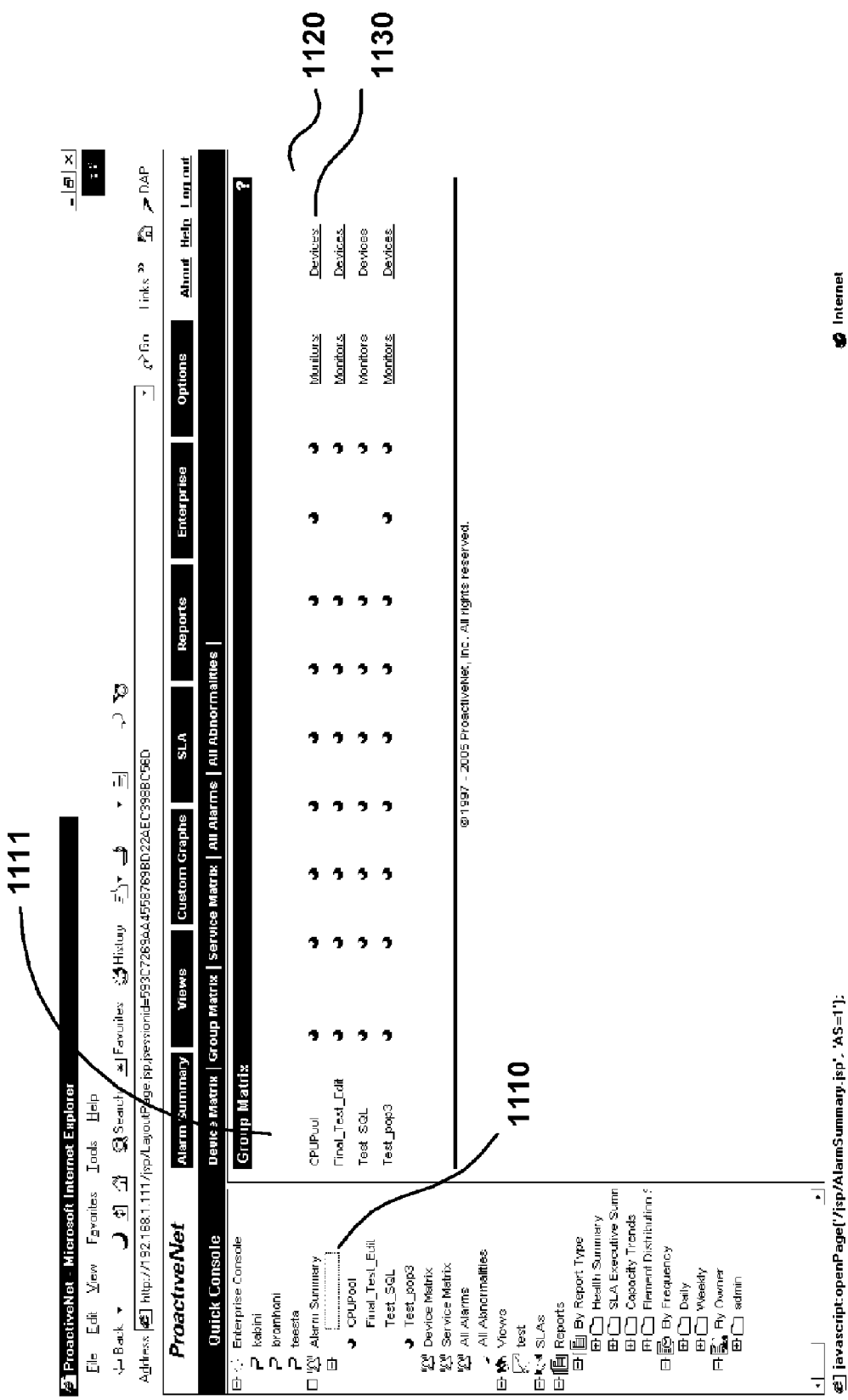
FIGS. 11A and 11B indicate how a network monitoring system can be used to display various performance attributes monitored for a resource pool in an embodiment of the present invention.
Figure 11B:
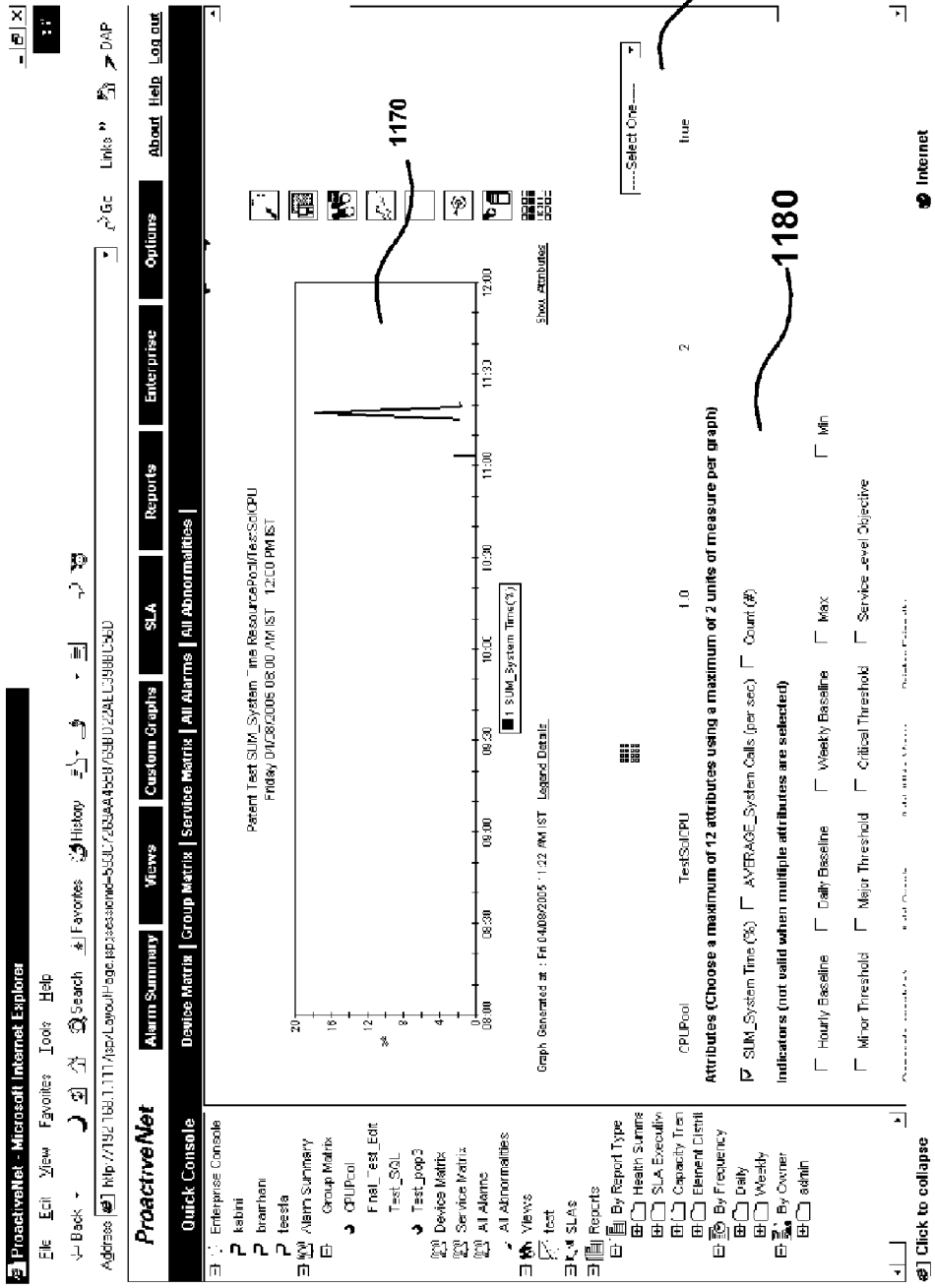

Lines 851-852 indicate the manner in which aggregate information relating to the attributes of interest can be displayed (as seen in row 1180 of FIG. 11B). Line 851 corresponds to attribute "Sum System Time" selected by the user/administrator in row 734 of FIG. 7B. Variable entitled 'AttrID' (501017072 in this case) is obtained by concatenating the value of a second variable 'UsrAttrID' (072 in this case) with MOTypeid value (501017) from line 801. The values may be assigned using some simple scheme (e.g., lowest unassigned value in a certain range of numbers). NMS 310 uses AttrID as a unique identifier for the attribute within the system.

Variable entitled 'DisplayName' contains display string value for the attribute ('SUM_System Time' in this case). Variable entitled 'UniqueName' contains unique name value for the attribute ('STATS01' in this case). The display name is not necessarily unique, so either the AttrID value or the unique name value may be used to distinguish one attribute from another. Unique name value is intended to be in human readable form, whereas AttrID is not easily comprehensible since it is intended for computation purposes (e.g., as a key in Database 130). Variable entitled 'AttrType' specifies type of this attribute (statistics in this case). This is set to stats since it is an output attribute used to record the value obtained in a monitor poll.

Variable entitled 'UOM' specifies the units of measurement for this attribute ('%' in this case). That is, the aggregate 'System Time' parameter for two or more Solaris CPU resource elements is computed and displayed as a percentage value. Variable entitled 'IsDefaultStats' specifies if this is a default attribute for which data is collected (yes in this case). Variable entitled 'TableName' gives the table name in Database 130 for this attribute ('_SOLCPU1' in this case).

The database table name is derived from the unique name for this monitor type (see field 732 in FIG. 7B and line 802 in FIG. 8A). Variable entitled 'ColumnName' gives the column name for this attribute ('STATS01' in this case). The column name is derived from the unique name for this attribute (STATS01 on line 851). Variable entitled 'UseNormalDistribution' specifies if the data for this attribute follows the statistical Normal Distribution form (yes in this case). Variable entitled 'IsDisplayed' specifies if this attribute is displayed (yes in this case) as seen in line/row 1180 and also graph 1170 in FIG. 11B.

Lines 861-868 contain definitions of pre-defined input control attributes used to control the data collection behavior of a monitor instance. Line 861 corresponds to drop-down list box 1018 in FIG. 10B and relates to the poll interval (frequency with which this monitor instance will poll to obtain values for attributes defined in the monitor type). Variable entitled 'AttrID' (501017998 in this case) is obtained by concatenating the value of a second variable 'UsrAttrID' (998 in this case) with MOTypeid value (501017) from line 801. The values may be assigned using some simple scheme (e.g., lowest unassigned value in a certain range of numbers). NMS 310 uses AttrID as a unique identifier for the attribute within the system.

Variable entitled 'DisplayName' contains display string for the attribute ('Statistics Poll Interval' in this case). Variable entitled 'UniqueName' contains unique name value for the attribute ('STSPOLLPERIOD' in this case). The display name is not necessarily unique, so either the AttrID value or the unique name value may be used to distinguish one attribute from another. Unique name value is intended to be in human readable form, whereas AttrID is not easily comprehensible since it is intended for computation purposes (e.g., as a key in Database 130).

Variable entitled 'DisplayType' specifies how the values for this attribute will be displayed (integer in this case). Variable entitled 'AttrMetaType' specifies the type of this attribute (control in this case). Variable entitled 'InputOnCreate' specifies if an input value must be provided at the time of monitor instance creation (yes in this case). Variable entitled 'Editable' specifies if the value input for this attribute may be edited and set to another value (yes in this case).

Variable entitled 'RequiredOnCreate' specifies if this is a required or optional input to create the monitor instance (yes in this case, shown with an asterisk * to indicate a required field for drop-down list box 1018 in FIG. 10B). Variable entitled 'Default' specifies the default value set for this attribute in case the user/administrator does not specify another value during monitor instance creation (900 seconds in this case, which equals the value of 15 minutes shown in drop-down list box 1018 in FIG. 10B).

The pool monitor type thus defined can be used to instantiate several monitor instances, with each monitor instance monitoring a corresponding resource pool. The description is continued with respect to the manner in which a monitor instance can be created.

9. Creating a Monitor Instance

Creating monitor instances entails indicating the resource elements to be monitored consistent with the pool monitor defined above. Broadly, FIG. 9A-9D contain display screens using which resource elements forming a resource pool can be defined, and FIGS. 10A-10C contain display screen which facilitate an administrator to associate the defined resource pool with a pool monitor type (also defined earlier). FIGS. 9A-9D and 10A-10C are described briefly below.

Figure 9A:
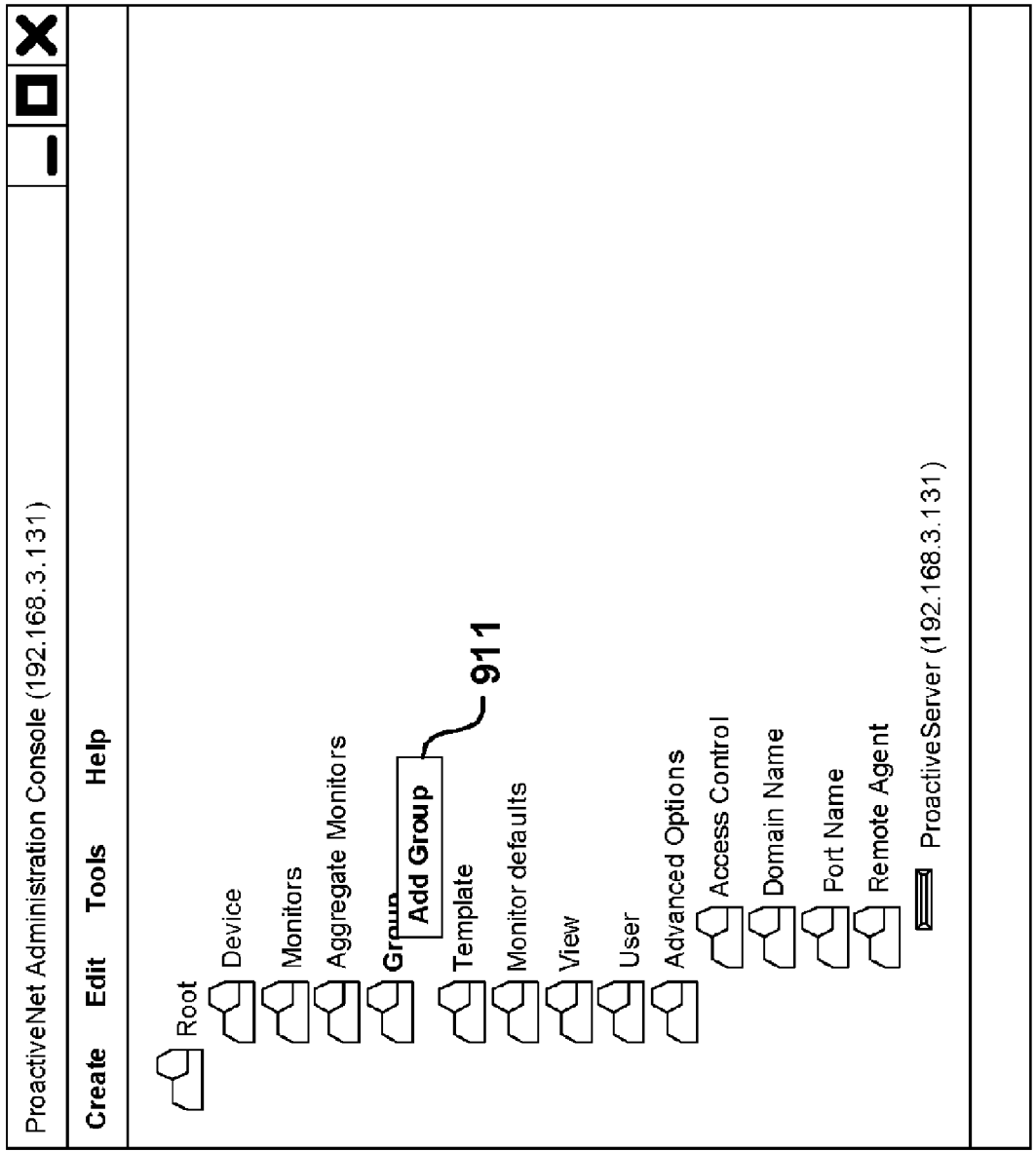
FIG. 9A-9D contain display screens used by an administrator while defining a resource pool.
Figure 9B:
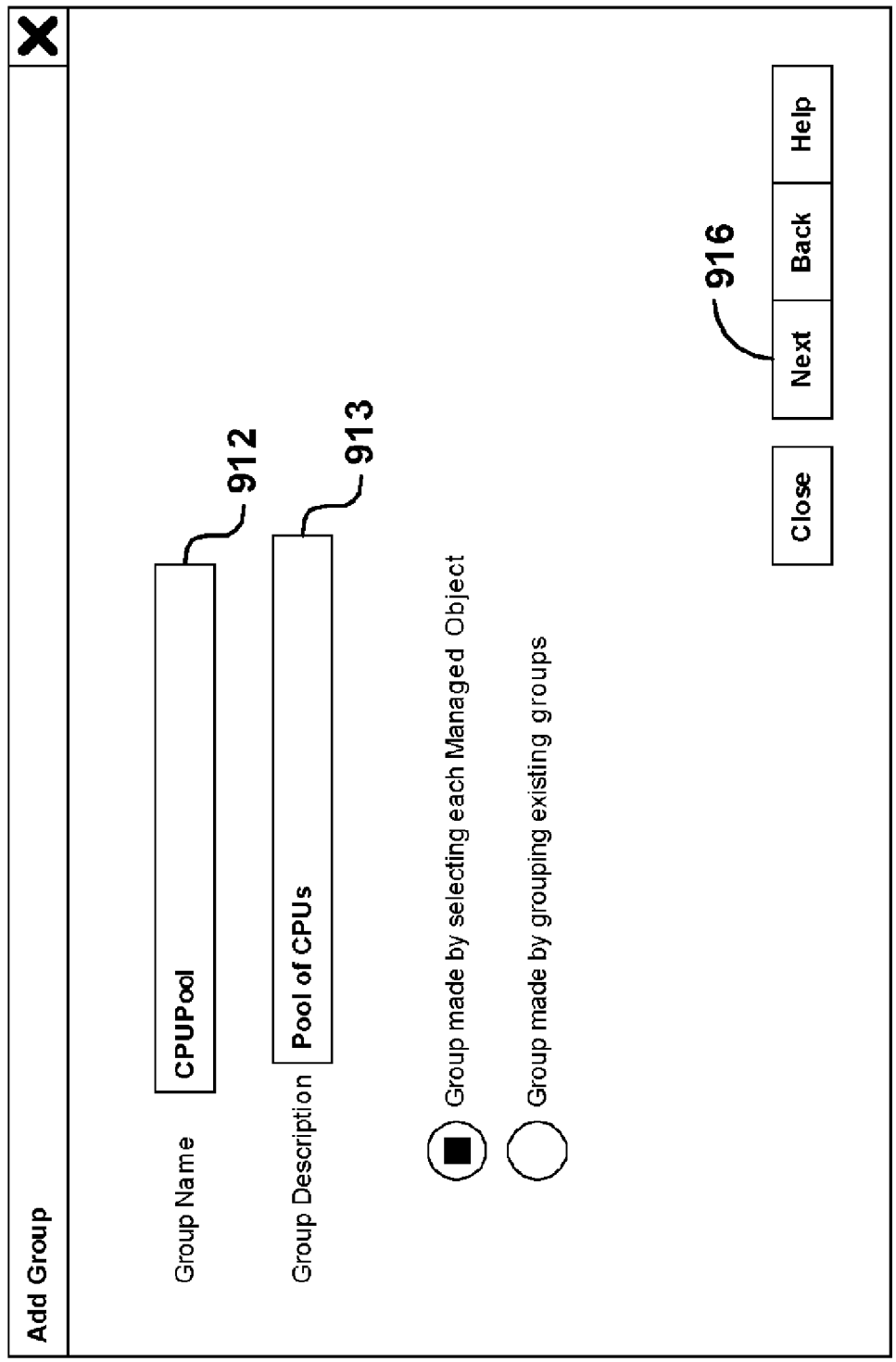

On selecting 'Add Group' control 911 (associated with 'group') of FIG. 9A, the administrator (or user) creating the resource pool is provided with the display screen of FIG. 9B. Input values in entries 912 and 913 respectively indicate that the name of the resource pool and the corresponding description as 'CPUPool' and 'Pool of CPUs'. Control is then transferred to form of FIG. 9C when the user selects next button 916.

Figure 9C:
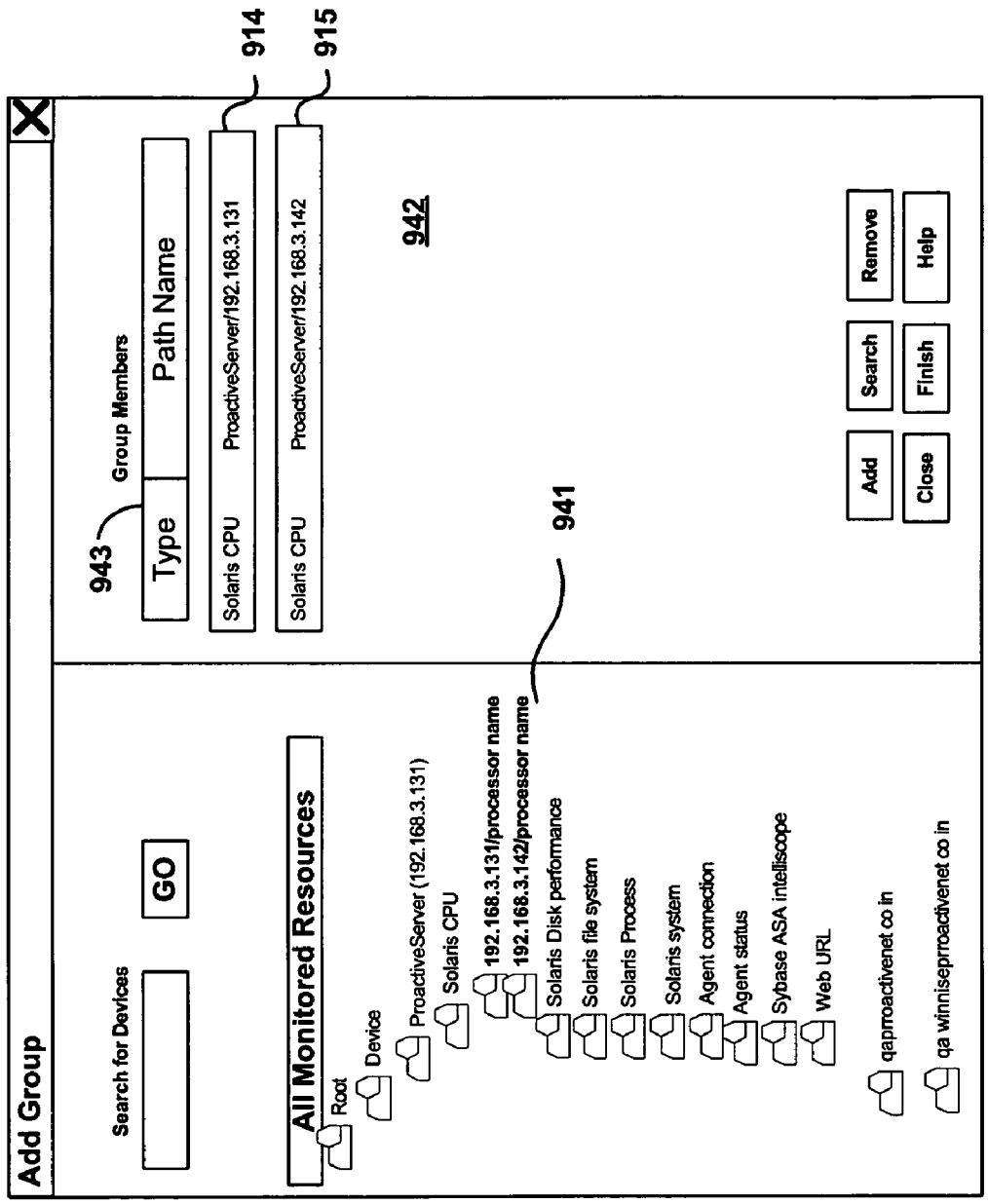
Figure 9D:
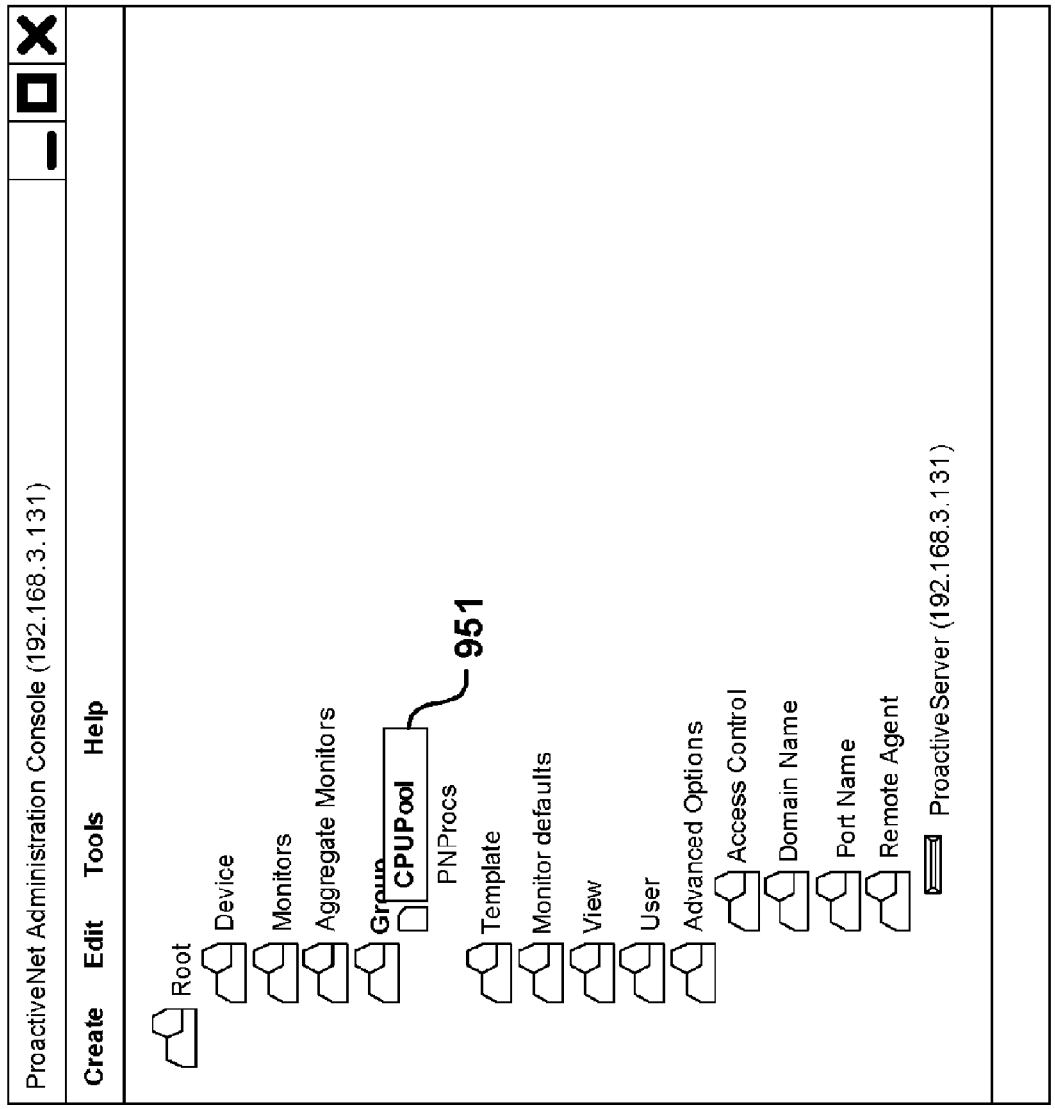

FIG. 9C depicts the resource elements selected. Portion 941 depicts the various resource elements grouped according to the corresponding (element) type. The administrator is assumed to have selected the two resource elements under type 'Solaris CPU', and accordingly portion 942 contains the two resource elements (in rows 914 and 915) and the corresponding type (in column 943). Successful creation of the resource pool could be verified (by the user/Administrator) by examining the list of values under 'groups' (951) of FIG. 9D.

Figure 10A:
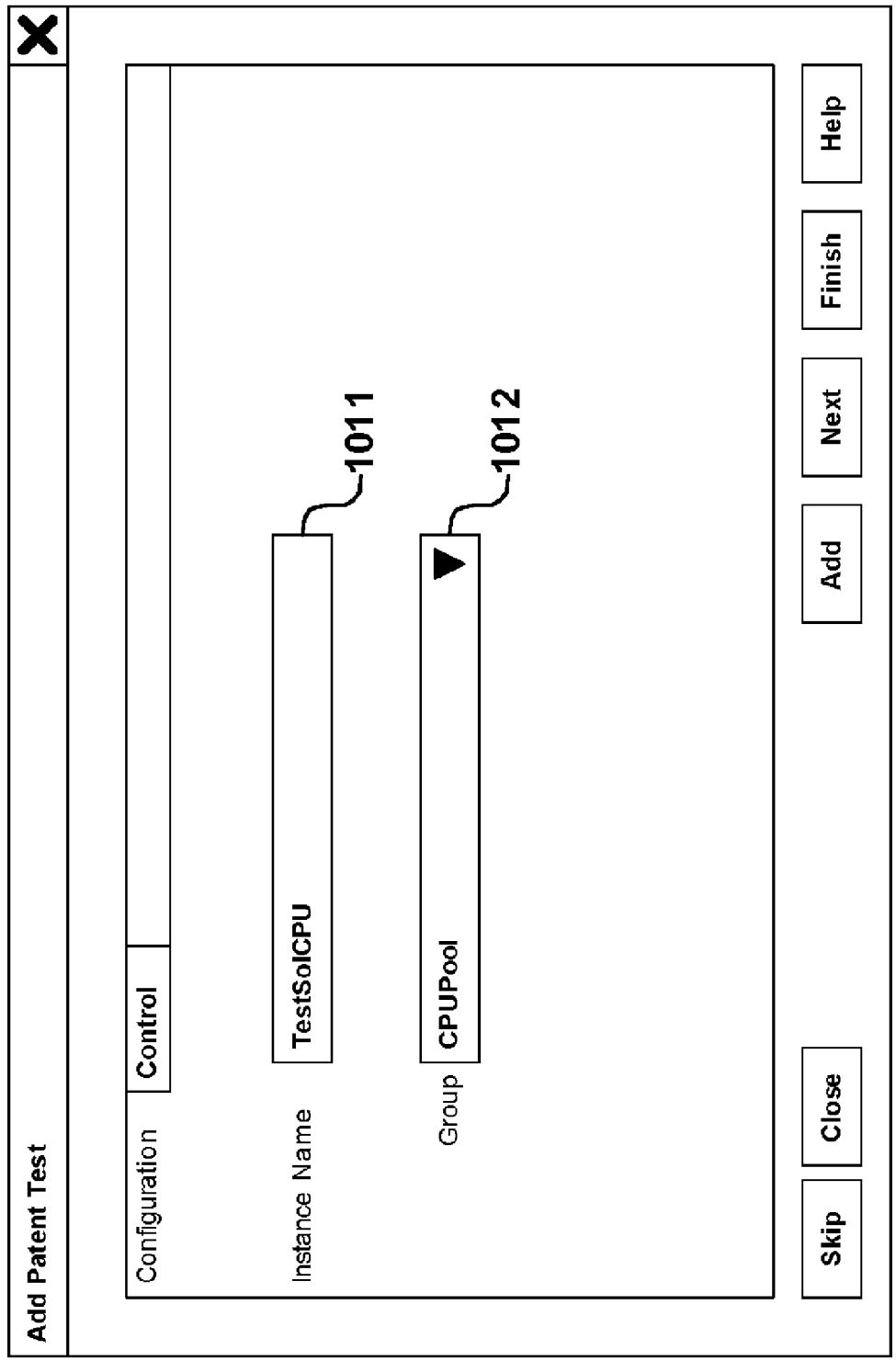
Figure 10C:
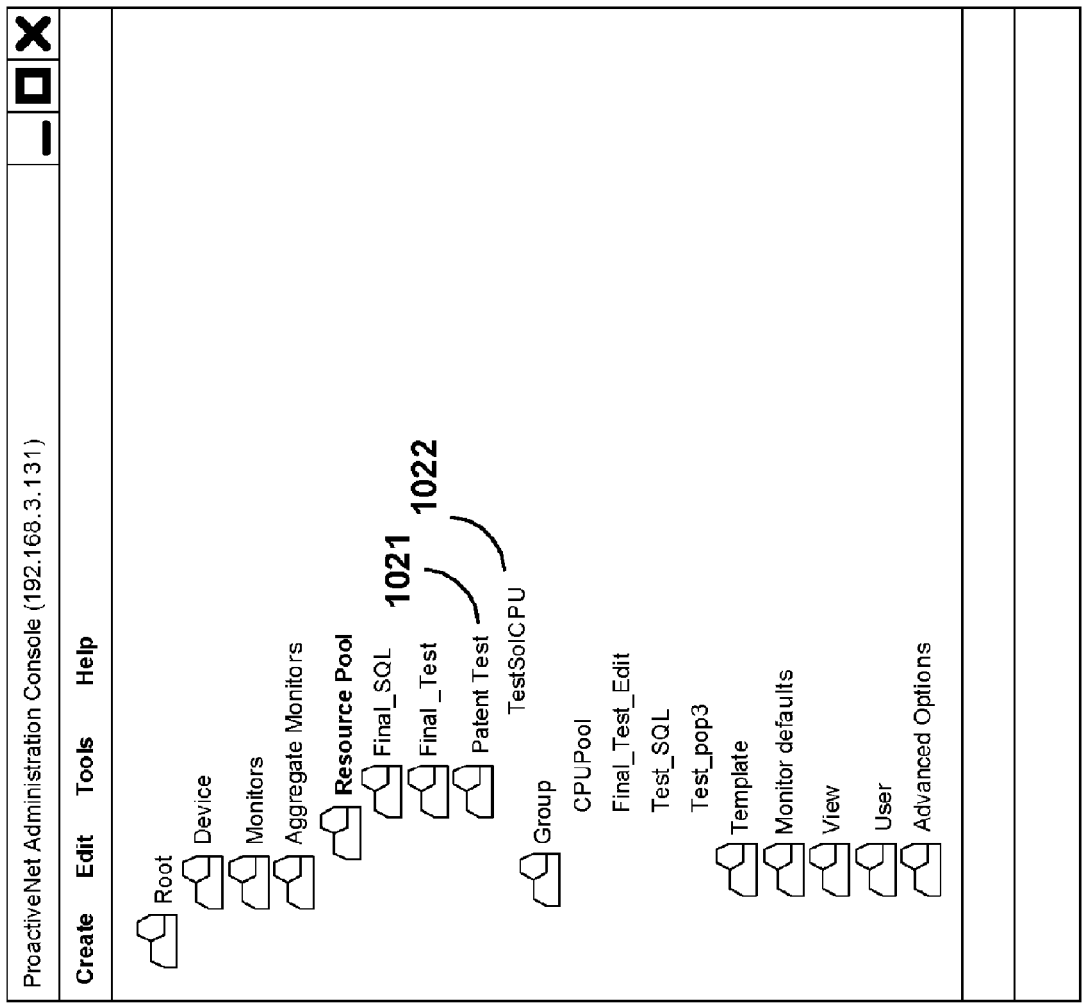

FIG. 10A contains a display screen which is shown when an administrator uses the 'Add' option in FIG. 7C and requests that a monitor instance be created using the pool monitor type 'Patent Test'. In FIG. 10A, the administrator is shown assigning a name TestSolCPU (Entry 1011) for the Resource Pool 'CPUPool' (selected using list box 1012).

In FIG. 10B, the administrator is shown assigning one or more control parameters for the TestSolCPU monitor instance defined in the configuration tab shown in FIG. 10A. The control parameters may be set at their default values, or changed depending on the administrator's need, and are used to control the behavior of the monitor instance during the data collection process. For example, 'Statistics Poll Interval' (entry 1018) determines the frequency of data collection, and 'Statistics Poll Timeout' (entry 1019) determines the duration of time after which a poll request will time out due to some reason such as the monitored object not being available.

Similarly, 'Configuration Poll Interval' (entry 1016) determines the frequency of polling to check for any configuration changes (e.g., if the CPU is upgraded), and 'Configuration Poll Timeout' (entry 1017) determines the duration of time after which a configuration poll request will timeout due to some reason such as the monitored object not being available. Successful creation of the monitor instance is verified using the display screen of FIG. 10C (as indicated by lines 1021 and 1022).

On completion of above steps, monitoring system 110 monitors attributes of interest defined in monitor type 'PatentTest' in each resource element of CPUPool (according to step 230). The aggregated information may then be displayed as described below.

10. Displaying Aggregated Information

FIGS. 11A and 11B contain display screen illustrating the manner in which aggregate information related to resource pools is displayed in one embodiment. The display screen of FIG. 11A is displayed when a user accesses a pre-specified URL (provided from NMS 310). The user may select 'Group Matrix' in portion 1110 to cause all the presently monitored (configured) resource pools to be displayed in portion 1120.

In portion 1120, group name (Column 1111) indicates the resource pools monitored. Row 1130 indicates that the monitored resource pools include CPUPool, which has been defined earlier with respect to FIGS. 9A-9D. When the user selects (clicks-on) monitors item in the same row, the display screen of FIG. 11B is generated.

FIG. 11B contains a graph (1170) for the aggregated value of the System Time (as a sum of the percentages of individual system times) for the Resource Pool CPUPool according to control parameter values specified by the administrator (in 1016 to 1019 of FIG. 10). Multiple aggregate information types (e.g., average, along with the sum) can be selected and viewed in parallel, if so desired by the user as shown in portion 1180.

Note that portion 1190 displays that the total number of monitor instances ('Total Instances' column) as being equal to 2. This corresponds to the two resource elements selected earlier in rows 914 and 915 of FIG. 9C.

Thus, by using the approaches of above, a user may view the aggregate information related to a resource pool formed from multiple resource elements.

While the description of above is provided with respect to resource elements which are in different physical systems, it should be appreciated that the resource elements can be present potentially in the same system. For example, different independent processes executing on a computer system, can be viewed as resource elements of a single pool. In addition, so long as the information attribute to be measured is the same for two resource elements, these two resource elements can be viewed as being of the same type, and modeled as a resource pool to measure that information attribute.

It should be understood that the different components of the network management system can be implemented in a combination of one or more of hardware, software and firmware. In general, when throughput performance is of primary consideration, the implementation is performed more in hardware (e.g., in the form of an application specific integrated circuit). When flexibility and/or cost are of primary consideration, the implementation is performed more in software (e.g., using a processor executing instructions provided in software/firmware). Cost and performance can be balanced by implementing with a desired mix of hardware, software and/or firmware. An embodiment implemented substantially in software is described below.

11. Software Implementation

Figure 12:
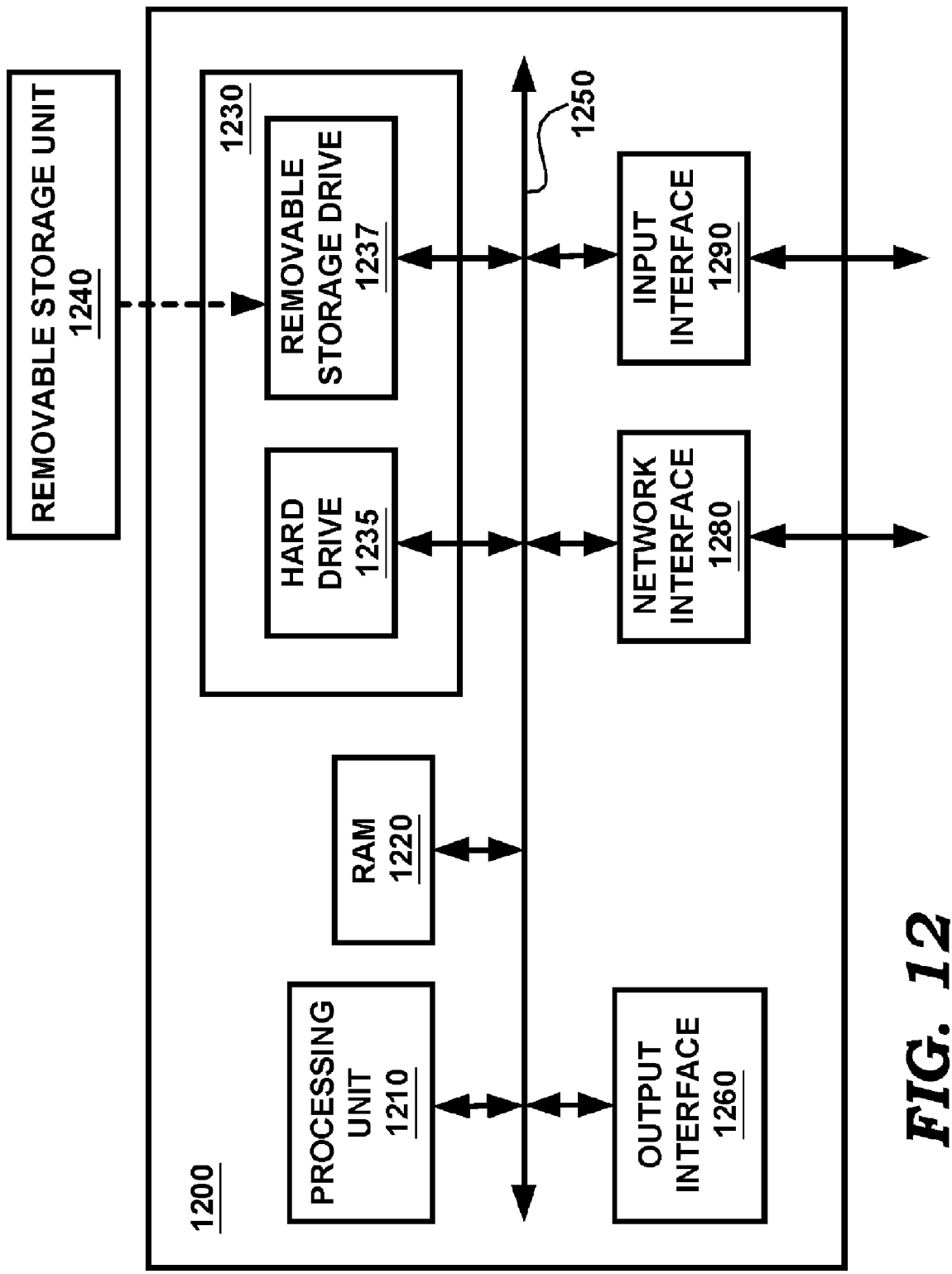
FIG. 12 is a block diagram of a computer system illustrating an example system in which various aspects of the present invention can be implemented.

FIG. 12 is a block diagram illustrating the details of system 1200 in one embodiment. System 1200 may correspond to NMS 310, administrator tool 360, and/or client 320. System 1200 is shown containing processing unit 1210, random access memory (RAM) 1220, secondary memory 1230, output interface 1260, network interface 1280 and input interface 1290. Each component is described in further detail below.

Input interface 1290 (e.g., interface with a key-board and/or mouse, not shown) enables a user/administrator to provide any necessary inputs to System 1200. Output interface 1260 provides output signals (e.g., display signals to a display unit, not shown), and the two interfaces together can form the basis for a suitable user interface for an administrator to interact with system 1200. For example, assuming an administrator (or user) interacts with NMS 310 using command line interface, the corresponding interface may be provided using input interface 1290 and output interface 1260.

Network interface 1280 may enable system 1200 to send/receive data packets to/from other systems on corresponding paths using protocols such as internet protocol (IP). The packets may form the basis for instantiating a monitor instance, to receive data points corresponding to various attributes, interface with client 320, etc. Network interface 1280, output interface 1260 and input interface 1290 can be implemented in a known way.

RAM 1220 receives instructions and data on path 1250 (which may represent several buses) from secondary memory 1230, and provides the instructions to processing unit 1210 for execution. Secondary memory 1230 may contain units such as hard drive 1235 and removable storage drive 1237. Secondary memory 1230 may store the software instructions and data, which enable System 1200 to provide several features in accordance with the present invention.

Some or all of the data and instructions may be provided on removable storage unit 1240 (or from a network using protocols such as Internet Protocol), and the data and instructions may be read and provided by removable storage drive 1237 to processing unit 1210. Floppy drive, magnetic tape drive, CD-ROM drive, DVD Drive, Flash memory, removable memory chip (PCMCIA Card, EPROM) are examples of such removable storage drive 1237.

Processing unit 1210 may contain one or more processors. Some of the processors can be general purpose processors which execute instructions provided from RAM 1220. Some can be special purpose processors adapted for specific tasks (e.g., for memory/queue management). The special purpose processors may also be provided instructions from RAM 1220.

In general, processing unit 1210 reads sequences of instructions from various types of memory medium (including RAM 1220, secondary memory 1230 and removable storage unit 1240), and executes the instructions to provide various features of the present invention described above. Thus, a medium providing such instructions/data may be referred to as a computer readable medium.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of monitoring a plurality of resource elements in a networked environment, each resource element having multiple associated attributes which can be monitored, said method comprising:
  enabling a user to select desired individual ones of a set of resource elements as a resource pool and an attribute of interest, said user to select said set of resource elements from said plurality of resource elements and said attribute of interest from said multiple associated attributes;
  polling each of said set of resource elements to retrieve a corresponding plurality of sample values corresponding to said attribute of interest at different time points;
  computing a sequence of aggregated values for a combination of all of said set of resource elements and for said attribute of interest at corresponding sequence of time points based on said plurality of sample values, wherein each aggregated value is computed based on the values polled around the same time point for said selected attribute of interest from each of said set of resource elements selected by said user; and
  displaying said sequence of aggregated values correlated with said sequence of time points,
  wherein said enabling is performed prior to said monitoring, said computing and said displaying,
  wherein said computing comprises calculating each of said sequence of aggregated values according to a formula, wherein each aggregated value is calculated by applying said formula to the values polled around the same time point from each of said set of resource elements selected by said user, wherein said formula is one of sum, mean, median, and variance computed from said plurality of sample values.

2. The method of claim 1, wherein said enabling comprises:
  indicating to said user that an element monitor type is available for said same type of resource elements, wherein said element monitor type is associated with a plurality of attributes related to said same type, wherein said plurality of attributes includes said attribute of interest;
  facilitating said user to select said attribute of interest and said set of resource elements; and
  instantiating a monitor instance in response to said user selecting said attribute of interest and said set of resource elements,
  wherein said monitor instance performs said polling to retrieve current values of said attribute of interest to determine said plurality of sample values of said set of resource elements.

3. The method of claim 2, wherein said enabling further comprises generating a pool monitor type in response to said user selecting said attribute of interest.

4. The method of claim 3, wherein said enabling further comprises:
  facilitating said user to specify said set of resources as said resource pool; and
  facilitating said user to associate said resource pool to said pool monitor type prior to said instantiating.

5. The method of claim 3, wherein said pool monitor type is represented in the form of data stored in a file on a secondary storage, said data indicating that said attribute of interest is to be monitored.

6. The method of claim 2, further comprising receiving an input from said user that said aggregated information is to be displayed for said attribute of interest, wherein said displaying displays said aggregated information due to said input.

7. The method of claim 6, further comprising:
  displaying a plurality of resource pools including said resource pool;
  facilitating said user to select said resource pool from said plurality of resource pools; and
  displaying attributes of interest specified in said pool monitor type,
  wherein said aggregated information is displayed for said attribute of interest after said user selects said attribute of interest from said displayed attributes.

8. The method of claim 1, wherein said user specifies a common control parameter, wherein said polling polls each of said set of resource elements according to said common control parameter.

9. The method of claim 8, wherein said common control parameter is a polling frequency, wherein said polling polls each of said set of resource elements at said polling frequency to retrieve the corresponding plurality of sample values.

10. A computer readable medium carrying one or more sequences of instructions for causing a network monitoring system to monitor several distributed resource elements in a networked environment, each resource element having multiple associated attributes which can be monitored, wherein execution of said one or more sequences of instructions by one or more processors contained in said network monitoring system causes said one or more processors to perform the actions of:

enabling a user to select desired individual ones of a set of resource elements as a resource pool and an attribute of interest, all of said set of resource elements being of a same type, said user to select said set of resource elements from said plurality of resource elements and said attribute of interest from said multiple associated attributes;

polling each of said set of resource elements to retrieve a corresponding plurality of sample values corresponding to said attribute of interest at different time points;

computing a sequence of aggregated values for a combination of all of said set of resource elements and for said attribute of interest at corresponding sequence of time points based on said plurality of sample values, wherein each aggregated value is computed based on the values polled around the same time point for said selected attribute of interest from each of said set of resource elements selected by said user; and displaying said sequence of aggregated values correlated with said sequence of time points, wherein said enabling is performed prior to said monitoring, said computing and said displaying, wherein said computing comprises calculating each of said sequence of aggregated values according to a formula, wherein each aggregated value is calculated by applying said formula to the values polled around the same time point from each of said set of resource elements selected by said user, wherein said formula is one of sum, mean, median, and variance computed from said plurality of sample values.

11. The computer readable medium of claim 10, wherein said enabling comprises:

indicating to said user that an element monitor type is available for said same type of resource elements, wherein said element monitor type is associated with a plurality of attributes related to said same type, wherein said plurality of attributes includes said attribute of interest;

facilitating said user to select said attribute of interest and said set of resource elements; and instantiating a monitor instance in response to said user selecting said attribute of interest and said set of resource elements, wherein said monitor instance performs said polling to retrieve current values of said attribute of interest to determine said plurality of sample values of said set of resource elements.

12. The computer readable medium of claim 11, wherein said enabling further comprises generating a pool monitor type in response to said user selecting said attribute of interest.

13. The computer readable medium of claim 12, wherein said enabling further comprises:

facilitating said user to specify said set of resources as said resource pool; and facilitating said user to associate said resource pool to said pool monitor type prior to said instantiating.

14. The computer readable medium of claim 12, wherein said pool monitor type is represented in the form of data stored in a file on a secondary storage, said data indicating that said attribute of interest is to be monitored.

15. The computer readable medium of claim 11, further comprising receiving an input from said user that said aggregated information is to be displayed for said attribute of interest, wherein said displaying displays said aggregated information due to said input.

16. The computer readable medium of claim 15, further comprising:

displaying a plurality of resource pools including said resource pool;

facilitating said user to select said resource pool from said plurality of resource pools; and displaying attributes of interest specified in said pool monitor type, wherein said aggregated information is displayed for said attribute of interest after said user selects said attribute of interest from said displayed attributes.

17. A digital processing system for monitoring a plurality of resource elements in a networked environment, each resource element having multiple associated attributes which can be monitored, said digital processing system comprising:

a memory to store a set of instructions;

one or more processors to retrieve said set of instructions from said memory and to execute said set of instructions to cause said digital processing system to perform the actions of:

enabling a user to select desired individual ones of a set of resource elements as a resource pool and an attribute of interest, said user to select said set of resource elements from said plurality of resource elements and said attribute of interest from said multiple associated attributes;

polling each of said set of resource elements to retrieve a corresponding plurality of sample values corresponding to said attribute of interest at different time points;

computing a sequence of aggregated values for a combination of all of said set of resource elements and for said attribute of interest at corresponding sequence of time points based on said plurality of sample values, wherein each aggregated value is computed based on the values polled around the same time point for said selected attribute of interest from each of said set of resource elements selected by said user; and displaying said sequence of aggregated values correlated with said sequence of time points, wherein said enabling is performed prior to said monitoring, said computing and said displaying, wherein said computing comprises calculating each of said sequence of aggregated values according to a formula, wherein each aggregated value is calculated by applying said formula to the values polled around the same time point from each of said set of resource elements selected by said user, wherein said formula is one of sum, mean, median, and variance computed from said plurality of sample values.

18. The digital processing system of claim 17, wherein said enabling comprises:

indicating to said user that an element monitor type is available for said same type of resource elements, wherein said element monitor type is associated with a plurality of attributes related to said same type, wherein said plurality of attributes includes said attribute of interest;

facilitating said user to select said attribute of interest and said set of resource elements; and instantiating a monitor instance in response to said user selecting said attribute of interest and said set of resource elements, wherein said monitor instance performs said polling to retrieve current values of said attribute of interest to determine said plurality of sample values of said set of resource elements.

19. The digital processing system of claim 18, wherein said enabling further comprises generating a pool monitor type in response to said user selecting said attribute of interest.

20. The digital processing system of claim 19, wherein said enabling further comprises:

facilitating said user to specify said set of resources as said resource pool; and facilitating said user to associate said resource pool to said pool monitor type prior to said instantiating.

* * * * *